United States Patent
Rix et al.

(10) Patent No.: US 11,352,451 B2
(45) Date of Patent: *Jun. 7, 2022

(54) DUAL METALLOCENE CATALYST COPOLYMER COMPOSITIONS

(71) Applicant: ExxonMobil Chemical Patents Inc., Baytown, TX (US)

(72) Inventors: Francis C. Rix, Houston, TX (US); Rhutesh K. Shah, Katy, TX (US); Rainer Kolb, Kingwood, TX (US); Jo Ann M. Canich, Houston, TX (US); Peijun Jiang, Katy, TX (US); Periagaram S. Ravishankar, Kingwood, TX (US); Syamal Tallury, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 313 days.

This patent is subject to a terminal disclaimer.

(21) Appl. No.: 16/315,722

(22) PCT Filed: Jun. 14, 2017

(86) PCT No.: PCT/US2017/037476
§ 371 (c)(1),
(2) Date: Jan. 7, 2019

(87) PCT Pub. No.: WO2018/013283
PCT Pub. Date: Jan. 18, 2018

(65) Prior Publication Data
US 2019/0169322 A1   Jun. 6, 2019

Related U.S. Application Data

(60) Provisional application No. 62/361,755, filed on Jul. 13, 2016.

(51) Int. Cl.
C08F 4/6592 (2006.01)
C08F 210/18 (2006.01)
(Continued)

(52) U.S. Cl.
CPC ....... C08F 4/65904 (2013.01); B01J 31/2295 (2013.01); C08F 4/61927 (2013.01);
(Continued)

(58) Field of Classification Search
None
See application file for complete search history.

(56) References Cited

U.S. PATENT DOCUMENTS 4,311,628 A   1/1982  Abdou-Sabet et al.
4,438,238 A * 3/1984  Fukushima ........... C08F 210/16
                                              264/331.17
(Continued)

FOREIGN PATENT DOCUMENTS

JP    8239416     9/1996
WO    2001/85839  11/2001
(Continued)

OTHER PUBLICATIONS

P.S. Ravishankar, "Rubber Chemistry and Technology," 2012, vol. 85, No. 3, pp. 327.
(Continued)

Primary Examiner — Fred M Teskin

(57) ABSTRACT

Processes are provided which include copolymerization using two different metallocene catalysts, one capable of producing high Mooney-viscosity polymers and one suitable for producing lower Mooney-viscosity polymers having at least a portion of vinyl terminations. The two catalysts may be used together in polymerization to produce copolymer compositions of particularly well-tuned properties. For instance, polymerizations are contemplated to produce high- (Continued)

Mooney metallocene polymers that exhibit excellent processability and elasticity, notwithstanding their high Mooney viscosity. Other polymerizations are also contemplated in which lower-Mooney metallocene polymers are produced, which also exhibit excellent processability and elasticity, while furthermore having excellent cure properties suitable in curable elastomer compound applications. Many of the contemplated polymerizations include controlling the ratio of the two metallocene catalysts used in the polymerization so as to obtain the desired Mooney viscosity and desired rheology (indicated by Mooney Relaxation Area) of the copolymer compositions.

16 Claims, 6 Drawing Sheets

(51) Int. Cl.
    *B01J 31/22*         (2006.01)
    *C08F 4/6192*      (2006.01)
    *C08F 110/06*      (2006.01)
    *C08F 4/659*       (2006.01)

(52) U.S. Cl.
    CPC .......... *C08F 110/06* (2013.01); *C08F 210/18* (2013.01); *B01J 2231/122* (2013.01); *C08F 4/65908* (2013.01); *C08F 2500/17* (2013.01); *C08F 2500/19* (2013.01)

(56) References Cited

U.S. PATENT DOCUMENTS

| | | |
|---|---|---|
| 6,506,857 B2 | 1/2003 | Rix et al. |
| 6,875,816 B2 | 4/2005 | DeGroot et al. |
| 6,924,342 B2 | 8/2005 | Stevens et al. |
| 7,999,039 B2 | 8/2011 | DeGroot et al. |
| 8,318,998 B2 | 11/2012 | Crowther et al. |
| 8,829,127 B2 | 9/2014 | Dharmarajan et al. |
| 10,253,172 B2 | 4/2019 | Ohtani |
| 10,385,198 B2 | 8/2019 | Canich et al. |
| 10,457,801 B2 | 10/2019 | Canich et al. |
| 10,808,049 B2 * | 10/2020 | Rix ...................... C08F 210/08 |
| 10,822,440 B2 | 11/2020 | Tsou et al. |
| 2008/0287620 A1 * | 11/2008 | Ravishankar ......... C08F 210/18 526/170 |
| 2012/0245311 A1 | 9/2012 | Crowther et al. |
| 2014/0051809 A1 | 2/2014 | Tse |
| 2015/0025209 A1 | 1/2015 | Canich et al. |
| 2015/0307641 A1 | 10/2015 | Bilbao et al. |
| 2016/0272744 A1 | 9/2016 | Yoon et al. |
| 2019/0309236 A1 | 10/2019 | Zhang et al. |
| 2020/0277427 A1 | 9/2020 | Dharmarajan et al. |

FOREIGN PATENT DOCUMENTS

| | | |
|---|---|---|
| WO | 2008/144120 | 11/2008 |
| WO | 2015/009832 | 1/2015 |
| WO | 2015/142547 | 9/2015 |
| WO | 2016/114914 | 7/2016 |

OTHER PUBLICATIONS

Dekmezian et al., "Characterization and Modeling of Metaliocene-Based Branch-Block Copolymers", Macromolecules, 2002, vol. 35, pp. 9586-9594.

Guzman et al., "Simple Model to Predict Gel Formation In Olefin-Diene Copolymerizations Catalyzed by Constrained-Geometry Complexes", AIChE Journal, May 2010, vol. 56, No. 5, pp. 1325-1333.

Nele et al., "Evolution of Molecular Weight and Long Chain Branch Distributions In Olefin-Diene Copolymerization", Macromol. Theory Simul., 2003, vol. 12, pp. 582-592.

Ohtaki et al., "Allyl-Terminated Polypropylene Macrmonomers: A Route to Polyolefin Elastomers with Excellent Elastic Behavior", Macromolecules, 2015, vol. 48, pp. 7489-7494.

Rose et al., "Poly(ethylene-co-propylene macroonomer)s: Synthesis and Evidence for Starlike Conformations in Dilute Solution", Macromollecules, 2008. vol. 41, pp. 559-567.

Shan et al., "Development of high Mooney viscosity, homogeneous long-chain branched EPDM", Rubber World, May 2014, pp. 1-5.

Soares et al., "Polyolefin Microstructural Modeling", Polyolefin Reaction Engineering, Wiley-VCH Ver;ag GmbH & Co. KGaA, 2012, pp. 187-269.

Van Ruymbeke et al., "Molecular rheology of branched polymers: decoding and exploring the role of architectural dispersity through a synergy of anionic synthesis, interaction chromatography, rheometry and modeling", Sof Matter, 2014, vol. 10, pp. 4762-4777.

Walter et al., "Influence of zirconocene structure and propene intent on melt rheology of polyethene and ethane/propene copolymers", Polymer Bulletin, vol. 46, 2002, pp. 205-213.

Wang et al., "Dynamic mechanical and rheological properties of metallocene-catalyzed long-chain-branched ethylene/propylene copolymers", Polymer, vol. 45, 2004, pp. 5497-5504.

Weng et al., "Long Chain Branched Isotactic Polypeopylene", Macromolecules, 2002, vol. 35, pp. 3838-3843.

* cited by examiner

DUAL METALLOCENE CATALYST COPOLYMER COMPOSITIONS

CROSS-REFERENCE OF RELATED APPLICATIONS

This application is a National Phase Application claiming priority to PCT Application Serial No. PCT/US2017/037476 filed Jun. 14, 2017, which claims priority to U.S. Provisional Application No. 62/361,755 filed Jul. 13, 2016, the disclosure of which is incorporated herein by reference.

FIELD OF THE INVENTION

This invention relates to the use of two metallocene catalyst systems in combination to produce high molecular weight, long chain branched copolymers, and the copolymer compositions so produced.

BACKGROUND OF THE INVENTION

Conventional Ziegler-Natta catalyst systems have long been used to produce copolymer compositions such as ethylene-propylene (EP) copolymers and ethylene/α-olefin/diene rubbers such as ethylene-propylene-diene rubbers (EPDM). Ziegler-Natta copolymers may have long chain branching structures. The presence of long-chain branching may lead to improved processability and some improved end-use properties for certain copolymer and terpolymers rubbers such as EP and EPDM rubbers. For instance, long chain branching may result in polymers exhibiting improved melt elasticity, and/or improved shear thinning (indicating polymer that is highly viscous at low shear rates, but less viscous at higher shear rates associated with processing of polymers such as extrusion).

However, traditional Ziegler-Natta catalyzed rubbers typically have a broader composition distribution (CD), such as a broader inter-chain distribution of ethylene-derived units, which may result in undesirably higher crystallinity. This could impact elasticity properties of rubbers, and/or processability of such rubbers. In addition, Ziegler-Natta processes are frequently more expensive than newer technologies, such as metallocene-based processes. Furthermore, it is believed that the mechanism of branching in Ziegler-Natta systems may also cause unintended crosslinking in copolymer compositions comprising diene and/or other polyene rubbers (e.g., EPDM), which forms very large networks. See, e.g., Ravishankar, P.S. Rubber Chemistry and Technology 2012, 85 (3) 327. This unintended crosslinking can lead to the formation of undesired gels in the polymerization reactor, which at best need to be separated from the product and at worst cause reactor fouling (or fouling in downstream processing units or conduits).

Metallocene-based copolymers and terpolymers frequently exhibit desirably narrow CD. In addition, metallocene processes provide other advantages over Ziegler-Natta processes, such as lower energy costs, no need for gel filtration, and no need for de-ashing, making for substantially simpler and more economic production processes. However, such metallocene copolymers and terpolymers typically lack long chain branching, and have narrower molecular weight distribution (MWD), which may adversely affect the performance and processability of metallocene-based copolymer rubbers such as metallocene-based EP rubber (mEP) and metallocene-based EPDM rubber (mEPDM).

It is therefore, a continued desire in the industry to discover metallocene polymerization catalysts and techniques that enable comparable or even superior rheological properties (e.g., shear-thinning, melt elasticity, lower loss angle, etc.) that are consistent with long-chain branched polymer architectures of some Ziegler-Natta copolymers. Ideally, such copolymer compositions also have high molecular weight (as shown, e.g., with Mooney Viscosity values). The present inventors have devised various particular polymerization techniques useful in creating such metallocene-catalyzed copolymers.

Along these and similar lines, some relevant publications include U.S. Publication No. US 2015/0025209 as well as those identified in Paragraphs [0005]-[0011] in US 2015/0025209 (incorporated by reference herein); WIPO Publication No. WO 2015/009832 as well as the publications identified in Paragraph [0004] of WO 2015/009832 (incorporated by reference herein); and also the following: U.S. Patent Publication Nos. 2012/0245311, 2014/0051809; U.S. Pat. Nos. 6,506,857, 6,875,816, 6,924,342, 7,999,039, 8,318,998, 8,829,127; and Japan unexamined Patent Publication H 8-239416.

The present inventors have found a dual metallocene catalyst reaction system to be particularly useful in creating certain advantageous metallocene polymer compositions that exhibit comparable or even superior properties to incumbent Ziegler-Natta polymer compositions, without the associated downsides of such Ziegler-Natta polymers. In particular, many of the present polymer compositions exhibit comparable or even superior elasticity, while also possessing particular advantageous properties such as lower Mooney viscosity and more economical production, in some instances, and/or superior elasticity and curability. For instance, high Mooney copolymer compositions with a high degree of long-chain branching, produced according to some embodiments, may be particularly suitable for imparting a good combination of mechanical and elastic properties (in particular when such copolymer compositions are employed as a rubber component in thermoplastic vulcanizate applications).

Yet other embodiments include copolymer compositions having relatively low Mooney viscosity for use in wire and cable applications. Extensive long-chain branching in such copolymer compositions provides excellent compound processability, which may enable extrusion at high throughput without melt fracture.

SUMMARY OF THE INVENTION

The dual metallocene catalyst system includes (1) a first metallocene catalyst capable of producing high molecular-weight polymer chains, and in particular capable of incorporating vinyl-terminated hydrocarbon chains into the growing high molecular-weight polymer chain; and (2) a second metallocene catalyst capable of producing lower molecular-weight polymer chains, and which further generates a relatively high percentage of vinyl-terminated polymer chains. The first metallocene catalyst in some aspects is a bridged fluorenyl-cyclopentadienyl (Cp) group 4 complex, although other classes of metallocene catalyst (e.g., mono-Cp amido group 4 complexes, biphenyl phenol transition metal complexes, or pyridyl amide and/or diamide transition metal complexes) may be suitable. The second metallocene catalyst in some aspects is a bisindenyl transition metal complex.

Polymerization processes according to certain aspects include polymerizing a plurality of monomers in the presence of the first and second metallocene catalysts in order to obtain polymer compositions having particular target (i) Mooney viscosity, and (ii) Mooney relaxation area. In certain of these embodiments, polymerization is controlled so as to obtain a polymer composition having a desired Mooney viscosity; and molar or weight ratio of the first catalyst to the second catalyst is adjusted, maintained, or otherwise controlled in order to obtain a polymer composition having target Mooney relaxation area. Preferably, the polymerization takes place in single polymerization reaction zone, e.g., a single polymerization reactor.

Careful control of these parameters using the dual catalyst systems of various embodiments herein enables one to obtain metallocene-catalyzed polymers of particularly advantageous properties, and suitable for deployment in a wide variety of applications, depending upon the polymerization conditions used.

For instance, processes according to some embodiments include carrying out the dual catalyst polymerization so as to obtain a high-Mooney viscosity polymer composition (preferably an ethylene copolymer composition such as an EPDM composition) having Mooney viscosity within the range of 20 to 59, preferably 30 to 55 MU (MST, 5+4 @ 200° C.). Target Mooney Relaxation Area (MSTRA) of some of these embodiments is within the range from 300 to 750 MU-sec, preferably from 350 to 550 MU-sec. The target Mooney and Mooney Relaxation Area may be obtained using catalyst ratios (molar ratio of first to second metallocene catalyst) within the range from 1 to 6, preferably 1 to 3.5, such as 1.5 to 2.5, 1 to 2, or 1.5 to 2. Resulting polymer compositions, and especially ethylene-based copolymer compositions such as EPDM compositions or other elastomeric compositions, exhibit an excellent combination of high elasticity and superior processability, even though they have high Mooney viscosity (correlating to high molecular weight). Elastomeric compositions according to such embodiments may advantageously be deployed as a rubber component in thermoplastic vulcanizates.

As another example, processes according to yet other embodiments include carrying out the dual catalyst polymerization so as to obtain a lower-Mooney viscosity polymer composition having Mooney viscosity within the range of 10 to 40 MU (ML, 1+4 @ 100° C.), preferably 10 to 35, such as 12 to 35 MU (ML, 1+4 @ 100° C.). Target Mooney Relaxation Area of such embodiments is within the range from 100 to 500 MU-sec, preferably within the range from 100 to 300 MU-sec. Resulting polymer compositions, and especially ethylene-based copolymer compositions such as EPDM compositions or other elastomeric compositions, exhibit superior elasticity and processability while also having excellent cure properties. Accordingly, copolymer compositions, and especially EPDM compositions, according to such embodiments are well-suited for use in cured and/or curable rubber applications, particularly in cured and/or curable compounds comprising or consisting of the polymer composition, curing agent, extender oil, and optional additives. Such cured and/or curable compounds may find use in electrical wiring insulation, as a modifier to polyethylene (e.g., of LLDPE), and other applications. Advantageously, such cured and/or curable compounds may exhibit compound viscosity ranging from 15 to 55, preferably from 20 to 40 MU (ML, 1+4 @ 100° C.), and compound viscosity to polymer viscosity ratio within the range from 1.0 to 2.0, preferably 1.0 to 1.5.

Without wishing to be bound by theory, it is believed that the polymer compositions obtained in various aspects, including those noted above, exhibit their advantageous and surprising properties owing at least in part to the excellent degree of branching obtained when using a dual metallocene catalyst system including the first and second metallocene catalysts in accordance with various embodiments of the present invention. This enables the control of the polymerization, including of the catalyst ratio and other parameters, to obtain polymer compositions that exhibit advantageous properties for various target applications, as may be tailored by, e.g., targeting the desired Mooney viscosities and Mooney Relaxation Areas.

DETAILED DESCRIPTION OF THE INVENTION

Figure 1:
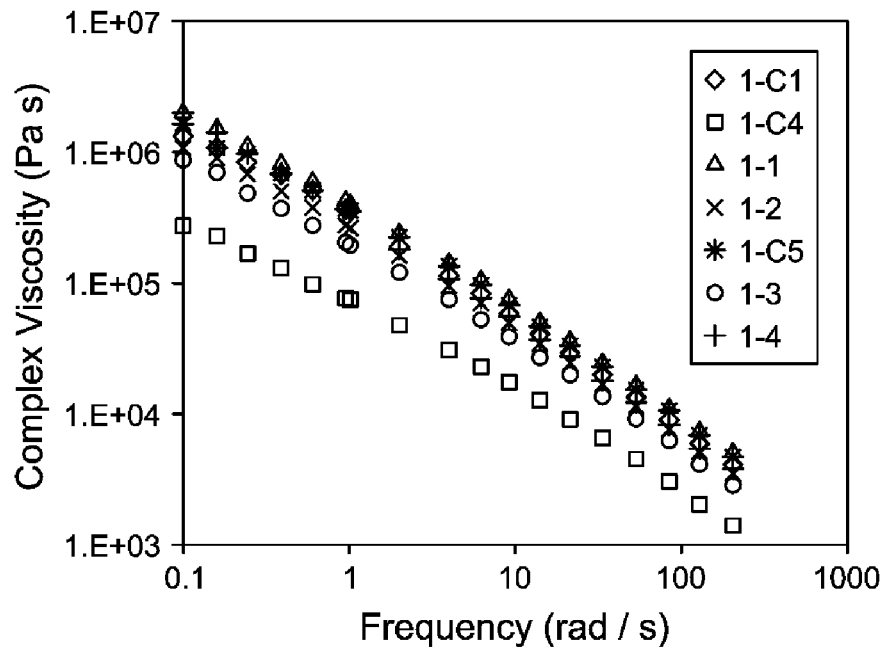
FIG. 1 is a plot of complex viscosities vs. shear frequency for samples in accordance with Example 1.

Processes of various embodiments employ dual metallocene catalyst polymerization, preferably in a single polymerization reaction zone, so as to obtain polymer compositions having (i) Mooney viscosity in a desired range, and (ii) Mooney Relaxation in a desired range. The dual metallocene catalyst polymerization includes polymerization of a plurality of monomers in the presence of a first metallocene catalyst and a second metallocene catalyst. In particular embodiments, the molar ratio of the first to the second metallocene catalyst is adjusted, maintained, or otherwise controlled so as to obtain the polymer composition having Mooney Relaxation Area within the target range.

Polymer compositions produced by such dual catalyst systems and having particular combinations of (i) Mooney viscosity, and (ii) Mooney Relaxation Area may exhibit particularly advantageous combinations of properties, and in particular, such compositions typically exhibit advantages elasticity and processability as compared to polymer compositions of similar Mooney viscosity and/or similar composition. This is believed to be at least in part due to (i) the dual catalyst system's production of bimodal polymer compositions; and (ii) the rheology of the polymer compositions, and in particular of the high-Mooney fraction of the compositions, consistent with long-chain branching.

Definitions

As used herein, the numbering scheme for the Periodic Table Groups is the notation as set out in CHEMICAL AND ENGINEERING NEWS, 63(5), 27 (1985). Therefore, a "group 4 metal" is an element from group 4 of the Periodic Table, e.g., Zr, Ti, and Hf.

References are made herein to metallocene catalysts. The ordinarily skilled artisan will recognize that a metallocene catalyst composition is typically activated prior to its use in polymerization, so as to put the metallocene catalyst into its ionic form that reacts with the monomers to produce polymers. Such an activated catalyst may be referred to as an "activated catalyst" or the catalyst may otherwise be referred to as "activated." However, the ordinarily skilled artisan will readily be able to determine the state of the metallocene catalyst (i.e., activated or still in un-activated, or precursor, form) from the context of the discussion; therefore, a metallocene catalyst is not always necessarily referred to as "activated" or "pre-activated," but instead may simply be referenced as a metallocene catalyst, or simply as a "catalyst." For instance, a catalyst fed to and/or disposed in a polymerization reaction zone to effect polymerization can readily be assumed to be in the activated form (with or without a charge balancing moiety resulting from activation) unless specifically noted otherwise; on the other hand, a metallocene catalyst composition described as being contacted with an activator or a catalyst activator can readily be assumed to be in the un-activated or precursor form (i.e., having anionic ligands bonded to the transition metal). Likewise, although catalyst composition structures may be described herein in their un-activated form, it will be readily apparent that the active form is also intended to be included in such description; and vice-versa. The activated form will be readily apparent to the skilled artisan upon review of the un-activated or precursor form, and vice-versa.

A "dual catalyst system" or "dual metallocene catalyst system," as used herein, references a reaction or other process utilizing two different catalysts, or two different metallocene catalysts, respectively. Likewise, a "dual catalyst polymerization" or "dual catalyst metallocene polymerization" references a process in which polymerization of one or more types of monomers takes place in the presence of two different catalysts, e.g., two different metallocene catalysts.

A "polymerization reaction zone" includes any space in which the polymerization of monomers may take place. Particular examples include a polymerization reactor or a set of multiple polymerization reactors connected in series or operating in parallel, which may be in accordance with any known polymerization reactor (e.g., a continuous stirred tank reactor, a solution reactor, fluidized bed, or the like). In preferred embodiments, a polymerization reaction zone comprises a single polymerization reactor.

A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound. A transition metal compound may be neutral as in a precatalyst, or a charged species with a counter ion as in an activated catalyst system.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn (Mw/Mn). Unless otherwise noted, all molecular weight units (e.g., Mw, Mn, Mz) are g/mol. An "alkyl" group is a linear, branched, or cyclic radical of carbon and hydrogen. In a preferred embodiment, "alkyl" refers to linear alkyls.

As used herein, a "copolymer" refers to any polymeric compound formed from, and/or containing units derived from, two or more monomeric units. Copolymers include "terpolymers," which are a more specific case of polymeric compound formed from and/or containing units derived from three monomeric units.

Dual Catalyst Polymerizations

Processes according to various embodiments include polymerizing a plurality of monomers in the presence of a first metallocene catalyst and a second metallocene catalyst different from the first, preferably in the same polymerization reaction zone. The first metallocene catalyst is capable of producing high-Mooney polymer compositions (i.e., longer or higher molecular weight chains); the second produces relatively lower-Mooney polymer compositions (i.e., shorter or lower molecular weight chains) having a portion of vinyl terminated chains. Used together, the catalysts may (i) produce a bimodal polymer composition (the high-Mooney fraction produced by the first metallocene catalyst; the low-Mooney fraction produced by the second metallocene catalyst), wherein (ii) the high-Mooney fraction exhibits rheology consistent with long-chain-branching. Without wishing to be bound by theory, it is believed that the rheology of the high-Mooney fraction is due at least in part to the second catalyst's production of vinyl-terminated polymer chains, which are incorporated into the growing high-molecular weight polymer chains by the first catalyst, thereby resulting in long chain branches in such high-molecular weight polymer chains.

Polymerization in the presence of both catalysts enables production of tailored polymer compositions. In particular, some embodiments include producing a polymer composition within a particular Mooney viscosity range, and further include controlling or adjusting the molar ratio of the first catalyst to the second catalyst such that the polymer composition also has Mooney Relaxation Area within a desired range. Polymer compositions produced by the dual catalyst systems of some embodiments and further having a combination of (i) Mooney viscosity within a given range, and (ii) Mooney Relaxation Area within a given range exhibit advantageous properties, including enhanced elasticity and processability in various embodiments.

First Metallocene Catalyst

The first metallocene catalyst, as noted, is capable of producing high-Mooney (i.e., high-molecular weight) polymers, and it is in particular capable of incorporating vinyl-terminated polymer chains into the high-Mooney polymers it produces. Suitable catalyst compounds are described as "HMP catalysts" in Paragraphs [0076]-[0109] of International Patent Application No. PCT/US 15/67582, entitled "System and Process for Producing Polymer Compositions" and filed 28 Dec. 2015, which description is hereby incorporated by reference. As set forth therein, such catalysts include bridged fluorenyl-cyclopentadienyl group 4 complexes (and/or Cp-fluorenyl variants), mono-Cp amido group 4 complexes (and/or mono-Cp amido variants), biphenyl phenol (BPP) transition metal complexes, pyridyl amide transition metal complexes and/or pyridyl diamide transition metal complexes.

Particularly preferred first metallocene catalysts according to some embodiments include fluorenyl-cyclopentadienyl group 4 complexes having the general formula (I)

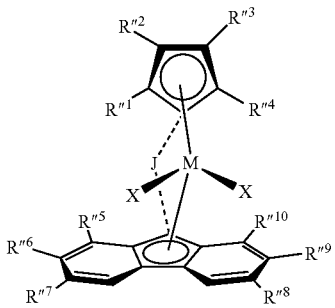

(I)

where: (1) J is a divalent bridging group (preferably comprising C, Si, or both); (2) M is a group 4 transition metal (with Hf being preferred in certain embodiments); (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R'''^1$, $R'''^2$, $R'''^3$, $R'''^4$, $R'''^5$, $R'''^6$, $R'''^7$, $R'''^8$, $R'''^9$, and $R'''^{10}$ is independently hydrogen, $C_1$-$C_{50}$ hydrocarbyl, substituted hydrocarbyl, halocarbyl, or substituted halocarbyl (preferably unsubstituted $C_1$-$C_{10}$ alkyl, more preferably $C_1$-$C_5$ alkyl), provided that any one or more of the pairs $R'''^1$ and $R'''^2$, $R'''^3$ and $R'''^4$, $R'''^5$ and $R'''^6$, $R'''^6$ and $R'''^7$, $R'''^8$ and $R'''^9$, and $R'''^9$ and $R'''^{10}$, may optionally be bonded together to form a saturated or partially saturated cyclic or fused ring structure. In some embodiments J is a bridging group comprising carbon and/or silicon atoms, such as dialkylsilyl; preferably J is selected from $CH_2$, $CH_2CH_2$, $C(CH_3)_2$, $SiMe_2$, $Si$ $Et_2$, $SiPh_2$, $SiMePh$, $Ph_2C$, $(p-(Et)_3SiPh)_2C$, $Si(CH_2)_3$, $Si(CH_2)_3$, $Si(CH_2)_4$, and $Si(CH_2)_5$, where Me is methyl, Et is ethyl, and Ph is phenyl.

It will be understood by the ordinarily skilled artisan that by reference to compounds having structure in accordance with formula (I), both the activated and un-activated (precursor) forms of the compound are contemplated.

In certain embodiments, (1) $R'''^6$ and $R'''^9$ are each $C_1$ to $C_4$ alkyl, preferably $C_4$ alkyl such as tert-butyl; (2) $R'''^1$-$R'''^4$, $R'''^5$, $R'''^7$, $R'''^8$, and $R'''^{10}$ are each independently methyl, ethyl, or H (preferably, each is H); (3) J is selected from any of the groups just noted above (preferably J is $(p-(Et)_3Si-Ph)_2C$); (4) M is Hf; and (5) each X is independently $C_1$-$C_3$ alkyl or a halide (preferably each X is methyl).

A particularly preferred first metallocene catalyst according to some embodiments comprises 1,1'-bis(4-triethylsilylphenyl)methylene-(cyclopentadienyl)(2,7-di-tertiary-butyl-fluoren-9-yl)hafnium dimethyl.

In other embodiments, the first metallocene catalyst may comprise a mono-Cp amido group 4 complex, such as those in accordance with the description at Paragraphs [0079]-[0085] of International Patent Application No. PCT/US15/67582, which description is herein incorporated by reference.

In yet other embodiments, the first metallocene catalyst may comprise a chelated transition metal complex (type 1) as described in Paragraphs [0093]-[0098] of International Patent Application No. PCT/US15/67582, which description is herein incorporated by reference. These include in particular biphenyl phenol transition metal complexes, such as those in accordance with the description in Paragraphs [0094]-[0098] of International Patent Application No. PCT/US15/67582, which description is herein incorporated by reference. For further description of such compounds, see also WO2003/091262, WO2005/108406, US 2006/0025548, US 2006/0052554, WO2007/136494, WO2007/136496, WO2007/136495, WO2009/064482, and WO2013/096573, each of which is incorporated by reference herein.

In some further embodiments, the first metallocene catalyst comprises chelated transition metal complexes (type 2) including pyridyl amide transition metal complexes, as described in Paragraphs [0099]-[00101] of International Patent Application No. PCT/US15/67582, which description is herein incorporated by reference. For further description of such compounds, see also WO2010/0227990, US 2004/0220050, WO2004/026925, WO2004/024740, WO2004/024739, WO2003/040201, and WO2002/046249, WO2002/038628, which are incorporated by reference herein.

In yet further embodiments, suitable first metallocene catalysts include chelated transition metal complexes (type 3), e.g., pyridyl diamide transition metal complexes, such as those described in Paragraphs [0102]-[0109] of International Patent Application No. PCT/US15/67582, which description is herein incorporated by reference. For further description of such compounds, see also US 2014/0316089, WO2012/134614, WO2012/134615, WO2012/134613, US 2012/0071616, US 2011/0301310, and US 2010/0022726, each of which is incorporated by reference herein.

Second Metallocene Catalyst

The second metallocene catalyst of some embodiments, as noted, produces relatively lower-Mooney polymer compositions (i.e., shorter chain or lower molecular weight polymers), at least a portion of which have vinyl-terminated chains suitable for incorporation into the polymer chains formed by the first metallocene catalyst. Suitable second metallocene catalyst compounds include those described as "VTP catalysts" in Paragraphs [0061]-[0065] of International Patent Application No. PCT/US15/67582, which description is herein incorporated by reference. As set forth therein, particularly useful second metallocene catalysts include group 4 transition metal metallocene catalyst compounds having two indenyl ligands (i.e., bis-indenyl transition metal complexes). Particularly useful second metallocene catalyst compounds include one or more of the metallocene compounds listed and described in Paragraph [0074] of PCT/US15/67582, which description is herein incorporated by reference, and/or in Paragraphs [0089]-[0090] of U.S. Ser. No. 14/325,449, filed Jul. 8, 2014, published Jan. 22, 2015 as US 2015/0025209, which is incorporated by reference herein.

In some embodiments, the second metallocene catalyst has structure in accordance with Formula (II)

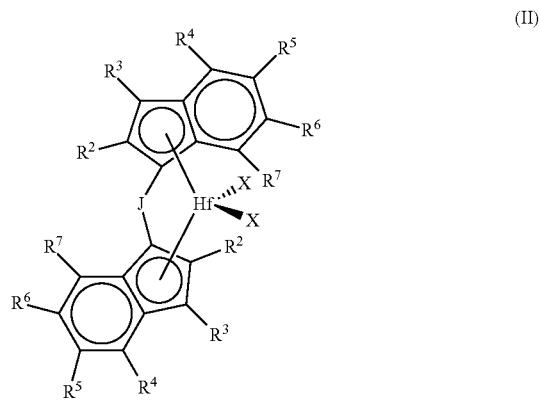

(II)

where: (1) J is a divalent bridging group comprising C, Si, or both; (2) each X is independently a univalent anionic ligand, or two Xs are joined and bound to the metal atom to form a metallocycle ring, or two Xs are joined to form a chelating ligand, a diene ligand, or an alkylidene ligand; and (3) each $R^2$, $R^3$, $R^4$, $R^5$, $R^6$, and $R^7$ is independently hydrogen, $C_1$-$C_{50}$ substituted or unsubstituted hydrocarbyl, or $C_1$-$C_{50}$ substituted or unsubstituted halocarbyl (preferably H or unsubstituted $C_1$-$C_{10}$ alkyl, more preferably H or $C_1$-$C_5$ alkyl), provided that any one or more of the pairs $R^4$ and $R^5$, $R^5$ and $R^6$, and $R^6$ and $R^7$ may optionally be bonded together to form a saturated or partially saturated cyclic or fused ring structure. Such compounds are also referred to as bis-indenyl metallocene compounds.

It will be understood by the ordinarily skilled artisan that by reference to compounds having structure in accordance with formula (II), both the activated and un-activated (precursor) forms of the compound are contemplated.

In certain embodiments, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof. Two Xs may form a part of a fused ring or a ring system. In particular embodiments, each X is independently selected from halides and $C_1$ to $C_5$ alkyl groups. For instance, each X may be a chloro, bromo, methyl, ethyl, propyl, butyl or pentyl group. In specific embodiments, each X is a methyl group.

J may be represented by the formula (IIa):

wherein J' is C or Si (preferably Si), x is 1, 2, 3, or 4, preferably 2 or 3, and each R' is, independently, hydrogen or $C_1$-$C_{10}$ hydrocarbyl, preferably hydrogen. Particular examples of J groups where J' is silicon include cyclopentamethylenesilylene, cyclotetramethylenesilylene, cyclotrimethylenesilylene, and the like. Particular examples of J groups where J' is carbon include cyclopropandiyl, cyclobutandiyl, cyclopentandiyl, cyclohexandiyl, and the like.

In some embodiments, J may be represented by the formula $(R^a{}_2J')_n$ where each J' is independently C or Si (again, with J' preferably Si), n is 1 or 2 (preferably n is 1), and each $R^a$ is, independently, $C_1$ to $C_{20}$ substituted or unsubstituted hydrocarbyl, provided that two or more $R^a$ optionally may be joined together to form a saturated or partially saturated or aromatic cyclic or fused ring structure that incorporates at least one J'. Particular examples of J groups include dimethylsilylene, diethylsilylene, and the like.

In particular embodiments, the second metallocene catalyst has structure in accordance with Formula II, and: (1) each $R^4$ and $R^7$ is independently $C_1$-$C_5$ alkyl, preferably $C_1$ to $C_3$ alkyl (and more preferably both are methyl); (2) each $R^2$ is H or $C_1$-$C_5$ alkyl, preferably $C_1$ or H, more preferably H; (3) $R^3$, $R^5$, and $R^6$ is each independently H or $C_1$-$C_5$ alkyl, preferably $C_1$ or H, more preferably H; (4) J is cyclopentamethylenesilylene, cyclotetramethylenesilylene, cyclotrimethylenesilylene, cyclopropandiyl, cyclobutandiyl, cyclopentandiyl, or cyclohexandiyl; (5) M is Hf; and (6) each X is independently a halide or $C_1$-$C_3$ alkyl, preferably methyl.

In particular embodiments, for instance, the second metallocene catalyst comprises one or both of: (1) cyclotetramethylenesilylene-bis(2,4,7-trimethylinden-1-yl)hafnium dimethyl; and (2) cyclotetramethylenesilylene-bis(4,7-dimethylinden-1-yl)hafnium dimethyl.

The second metallocene catalyst compounds can be in rac or meso form. In one particular embodiment, the second metallocene catalyst compound is in the rac form. For instance, at least 90 wt % of the catalyst compound may be in the rac form, based upon the weight of the rac and meso forms present. More particularly, at least any one of about 92, 93, 94, 95, 96, 97, 98, and 99 wt % of the catalyst compound may be in rac form. In one embodiment, all of the catalyst compound is in rac form.

The second metallocene catalyst compounds described herein may be synthesized in any suitable manner, including in accordance with procedures described in Paragraphs [0096] and [00247]-[00298] of U.S. Ser. No. 14/325,449, filed Jul. 8, 2014, and published Jan. 22, 2015 as US 2015/0025209, and which is incorporated by reference herein.

HMP and VTP Catalyst System Activators

The terms "cocatalyst" and "activator" are used herein interchangeably and are defined to be any compound which can activate any one of the catalyst compounds described above (including either or both of the first and second metallocene catalyst compounds) by converting the neutral catalyst compound to a catalytically active catalyst compound cation. Suitable activators are described in Paragraphs [0110]-[0115] of International Patent Application No. PCT/US15/67582, which description is herein incorporated by reference; and/or in Paragraphs [0110]-[0133] of U.S. Patent Publication No. 2015/0025209, which description is incorporated by reference herein.

Particularly useful activators in some embodiments include non-coordinating anion (NCA) activators, such as those in Paragraph [0124] of US 2015/0025209, and also those in Columns 7 and 20-21 in U.S. Pat. No. 8,658,556, which description is incorporated by reference. Particular examples of suitable NCA activators include: N,N-dimethylanilinium tetrakis(pentafluorophenyl)borate, N,N-dimethylanilinium tetrakis(perfluoronaphthyl)borate, N,N-dimethylanilinium tetrakis (perfluorobiphenyl)borate, triphenylcarbenium tetrakis(perfluoronaphthyl)borate, bis($C_4$-$C_{20}$alkyl)methylammonium tetrakis (perfluoronaphthyl)borate, $Me_3NH$ tetrakis(pentafluorophenyl)borate, $Me_3NH$ tetrakis(heptafluoro-2-naphthyl)borate, and bis(hydrogenated tallowalkyl)methylammonium tetrakis(pentafluorophenyl)borate.

The first and second metallocene catalysts may be activated by the same or by different activators. They may be activated together (when the same activator is used) or separately. In a particular embodiment, they are activated by the same activator either together or separately, preferably separately. Both catalysts can also be activated on-line in the catalyst feed line or in the polymerization reactor.

Further, the typical activator-to-catalyst molar ratio for each of the first and second metallocene catalysts is 1:1, although preferred ranges may include from 0.1:1 to 1000:1 (e.g., from 0.5:1 to 100:1, such as 2:1 to 50:1).

In some embodiments, the activator(s) is/are contacted with a catalyst compound to form the catalyst system comprising activated catalyst and activator or other charge-balancing moiety, before the catalyst system is contacted with one or more monomers. In other embodiments, the activator(s) may be co-fed to catalyst compound(s) together with one or more monomers. Preferably, each catalyst is contacted with its respective activator(s) before being mixed together and/or before being fed into the polymerization reaction zone.

Optional Scavengers or Co-Activators

In addition to the activator compounds, scavengers or co-activators may be used in conjunction with the first and second metallocene catalysts in a polymerization reaction zone. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc may be used.

Suitable α-Olefin and Diene Monomers

As noted, the polymerization processes described herein utilize one or more monomers as input to the dual catalyst polymerization. The monomers preferably comprise two or more α-olefins (so as to produce a copolymer composition), and in some embodiments, the monomers may further comprise one or more polyenes (preferably non-conjugated dienes).

Each of the one or more, preferably two or more, α-olefin monomers used in processes (and/or included in polymer compositions) herein is independently selected from $C_2$-$C_{40}$ α-olefins, preferably $C_2$ to $C_{20}$ α-olefins, more preferably $C_2$ to $C_{12}$ α-olefins (e.g., ethylene, propylene, butene, pentene, hexene, heptene, octene, nonene, decene, undecene, dodecene and isomers thereof). Suitable non-conjugated polyenes include any polyene described in Paragraph [220] of U.S. Patent Publication No. 2015/0025209 (the description of which is incorporated herein by reference), with 5-ethylidene-2-norbornene (ENB) and/or 5-vinyl-2-norbornene particularly (VNB) preferred, and ENB particularly preferred.

In particular embodiments, one of the α-olefins is ethylene. Thus, processes of such embodiments include polymerizing ethylene, one or more other α-olefins, and optionally one or more polyenes (preferably one or more dienes) in the presence of the first and second metallocene catalysts. The copolymer composition thusly obtained is an ethylene-based copolymer composition, preferably an EP (ethylene-propylene) copolymer composition, more preferably an EPDM (ethylene-propylene-diene) copolymer composition. It should be noted that although the term "EPDM" is used as shorthand in many instances herein, the ordinarily skilled artisan will recognize that an "EPDM" rubber could equivalently be produced using another α-olefin besides, or in addition to, propylene (e.g., in particular, 1-butene, 1-pentene, 1-hexene, 1-heptene, and/or 1-octene). Likewise, non-conjugated polyenes other than dienes could be used to similar effect. Such substitutions are expressly contemplated herein even where the shorthand "EPDM" is used, unless specifically noted to the contrary (e.g., by calling out the constituents of the EPDM composition as including only ethylene, propylene, and dienes).

Controlling Dual Catalyst Polymerizations

As noted, polymerization processes of various embodiments include polymerization in the presence of both the first and second metallocene catalysts in a polymerization reaction zone (such reaction zone preferably being a single polymerization reactor).

The processes of various embodiments herein include operating the polymerization (e.g., controlling and/or utilizing polymerization conditions, and/or contacting monomers with catalysts) such that a copolymer composition having a particular Mooney viscosity is obtained. The ordinarily skilled artisan will readily perceive how to control polymerization reaction conditions so as to obtain higher or lower Mooney viscosity polymer compositions. Higher Mooney viscosity polymer compositions correspond to compositions comprising higher molecular weight polymers (e.g., polymer compositions comprised of longer-chain polymers, such that the compositions have higher Mw and/or higher Mn will also have higher Mooney viscosity); likewise, lower Mooney viscosity polymer compositions correspond to compositions comprising lower molecular weight polymers. In short, operating the polymerization to obtain polymer compositions within a given Mooney viscosity range may be characterized as a matter of controlling the average chain length of polymers produced by the process, and/or of controlling molecular weight distribution (MWD) of the bimodal in-reactor blends of some embodiments.

Methods for such control are known, and include controlling polymerization reaction temperature and controlling feed rate of chain transfer agents (e.g., hydrogen) to the polymerization reaction zone, as well as controlling monomer (e.g., ethylene and/or propylene) concentration in the reaction zone. For instance, molecular weight (i.e., Mooney viscosity) control can be achieved through control of the reactor temperature (e.g., by adjusting the feed temperature of the monomers and solvent). Lowering the reactor temperature will generally lead to higher molecular weight (higher Mooney) while higher operating temperature may increase the catalyst activity and/or permit higher polymer concentrations in the reactor and achieve higher productivity (although higher catalyst activity typically means lower molecular weight or lower Mooney). However, the temperature should not exceed the polymerization decomposition temperature or the temperature at which the catalyst(s) can sustain the polymerization reactions.

Monomer concentration in the polymerization reaction zone can be controlled by one or more of monomer feed rate, catalyst feed rate, and residence time (particularly in continuous reaction processes). Higher Mooney viscosity can be achieved under higher monomer concentration. On the other hand, increasing catalyst feed rate may result in increased conversion but lower monomer concentration in the polymerization reaction zone, and therefore lower molecular weight.

Chain transfer agents such as hydrogen can be utilized to supplement control of molecular weight (e.g., hydrogen flow to the reaction zone is increased to lower the molecular weight (lower the Mooney viscosity)).

The general method for controlling polymer properties used for single catalyst polymerization applies to the dual catalyst process of the current invention. For polymerization with dual catalysts of the current invention, the Mooney viscosity is also determined by the amount (and molecular weight) of each polymer component derived from each respective catalyst (e.g., the first and second metallocene catalysts of various embodiments). Creation of the long chain branched molecular structure on the high molecular weight side (e.g., the polymers produced via the first metallocene catalyst) adds another element for Mooney viscosity control. MWD and degree of branching can be manipulated through change of the catalyst ratio. In the system of current invention, with other process variables held constant, the Mooney viscosity increases with increasing fraction of the first (high molecular weight-producing) metallocene catalyst until the Mooney viscosity reaches a peak point. That is, as catalyst ratio (mol:mol) of the first to the second metallocene catalyst increases, Mooney viscosity increases up to a point. The Mooney viscosity then decreases with increasing the fraction of the first metallocene catalyst. It is theorized that this eventual decrease of Mooney viscosity past a certain catalyst ratio (mol:mol) of first to second metallocene catalyst is due to fewer vinyl-terminated polymer chains being produced by the second metallocene catalyst (present at lower fraction), and therefore a reduction of vinyl-terminated polymer chains being incorporated by the first metallocene, thus lowering the overall polymer molecular weight and Mooney viscosity. Mooney relaxation Area (MLRA and MSTRA) follows a similar trend to that for Mooney viscosity with respect to the change of catalyst ratio. The corrected Mooney relaxation area (cMLRA and/or cMSTRA) generally decreases with increasing of the fraction of the first high molecular weight catalyst when the fraction of the first catalyst is 20 mol % or higher.

Accordingly, the polymerization methods of various embodiments herein also include operating the polymerization (e.g., controlling and/or utilizing polymerization conditions) so as to obtain polymer compositions of a desired Mooney Relaxation Area (which property is described in more detail in the "Test Methods" section below).

In preferred embodiments, operating the polymerization so as to obtain a desired Mooney Relaxation Area is based at least in part upon the molar ratio of first to second metallocene catalyst in the polymerization reaction zone. As used herein with respect to batch or semi-batch reactions in which the first and second metallocene catalysts are provided in a non-continuous manner to the polymerization reaction zone, a molar ratio may refer to the relative amounts (in moles) of each of the first and second metallocene catalyst provided to the polymerization reaction zone. With respect to continuous reaction processes in which catalysts are fed continuously to the polymerization reaction zone, molar ratio refers to the relative feed rates (mol/hr, mol/min, mol/s or the like) of the first and second metallocene catalysts.

Without wishing to be bound by theory, it is believed that the combination of first and second metallocene catalysts according to various embodiments herein provides for the advantageous careful tuning of the rheology properties (e.g., as indicated by the Mooney Relaxation Area) of polymer compositions.

However, the relationship between catalyst ratio and produced polymer properties is complicated by the synergistic effects between the first and second metallocene catalysts. In particular, it is also believed that the high-Mooney fraction that the first metallocene catalyst produces will have a long-chain-branched architecture, owing at least in part to the first catalyst's ability to incorporate vinyl-terminated chains (produced by the second metallocene catalyst) into the high-Mooney polymer produced by the first metallocene catalyst. Therefore, the first metallocene catalyst's production of a greater amount of high-Mooney polymer not only pushes the resulting polymer composition's Mooney viscosity higher; it also tends to make the polymer composition exhibit rheology properties more and more indicative of long-chain branching (owing to the greater amount of branched high-Mooney polymer produced). However, the formation of long chain branched architecture is a competitive process between monomer propagation and incorporation of the vinyl-terminated macromonomers (e.g., as produced by the second metallocene catalyst) in the same polymer chain in the same given polymerization environment. For this forcing effect on rheology to occur, there must also be an adequate amount of production of vinyl-terminated chains from the second metallocene catalyst. So, higher catalyst ratios (i.e., relatively more of the first metallocene) do not necessarily mean greater degree of long-chain branching.

Care must therefore be taken in determining particular catalyst ratios (at given other polymerization conditions for producing polymer compositions of a given Mooney viscosity) that balance both (i) the polymer composition's distribution of high- and low-Mooney fractions (produced by the first and second catalyst, respectively); and (ii) degree of branching and fraction of the branched architectures. In some particular embodiments, it is preferred to use conventional means for controlling Mooney viscosity (e.g., temperature, monomer concentration, and/or chain transfer agent feed rates) rather than utilizing catalyst ratios for that purpose; and, within the control parameters for obtaining the desired Mooney viscosity, obtain the desired polymer composition rheology (as indicated by, e.g., Mooney Relaxation Area) by controlling the reaction based at least in part upon catalyst ratios.

More generally, processes according to yet other embodiments include contacting the monomers with the first and second metallocene catalysts so as to obtain a copolymer composition having the desired properties (and, in particular, the desired Mooney viscosity and Mooney Relaxation Area, as set forth in more detail below).

Producing High-Mooney Copolymer Compositions

As noted, dual catalyst polymerization processes of particular embodiments include contacting a plurality of monomers with the first and second metallocene catalysts (and optionally, further including controlling the polymerization reaction) so as to obtain polymer compositions having particular Mooney viscosities and/or rheology (as shown by, e.g., Mooney Relaxation Area). One particular set of copolymer compositions may be obtained, wherein the copolymer compositions have relatively high Mooney viscosity, but still exhibit surprisingly excellent processability and elasticity, due at least in part, it is believed, to their rheology properties consistent with long-chain branching.

Accordingly, processes of some embodiments include contacting a plurality of monomers with a first and second metallocene catalyst so as to obtain a copolymer composition having (i) Mooney viscosity within the range from 20 to 59 MU (MST, 5+4 @ 200° C.); and (ii) Mooney Relaxation Area (MSTRA) within the range from 300 to 750 MU-sec. Other embodiments further include (a) controlling the dual catalyst polymerization reaction so as to obtain a copolymer composition having Mooney viscosity within the range from 20 to 59 MU (MST, 5+4 @ 200° C.); and (b) controlling the polymerization such that the copolymer composition has Mooney Relaxation Area (MSTRA) within the range from 300 to 750 MU-sec. Preferably, Mooney viscosity in the above-noted embodiments ranges from 30 to 55, or even 30 to 40 MU (MST, 5+4 @ 200° C.). And, the target Mooney Relaxation Area (MSTRA) is preferably within the range from 350 to 550 MU-sec.

With respect to (a), as noted previously, the ordinarily skilled artisan, with the benefit of this disclosure, will be readily able to recognize any of various means to control the polymerization reaction so as to obtain desired chain lengths (i.e., the desired Mooney viscosity). These include methods for controlling conversion (or monomer concentration) and/or feed rates of monomers, and the like.

In certain embodiments, the (a) controlling the polymerization so as to obtain a copolymer composition having the desired Mooney viscosities is based at least in part upon one or more of the following: (i) temperature of the polymerization reaction zone; (ii) monomer concentration in the polymerization reaction zone; and (iii) an amount of chain transfer agent fed to the polymerization reaction zone.

Preferred polymerization reactor temperatures in these embodiments may range from 50° C. to 300° C., but preferably are within the range from 90° C. to 200° C., such as 95° C. to 150° C. or 95° C. to 135° C. Reactor pressures may range from 100 to 2000 psig, 250 to 1500 psig, such as 350 to 1000 psig, or 400 to 800 psig. And, chain transfer agent may be fed (e.g., in continuous polymerization processes) at a concentration (within the feed) of up to 2 wt %, but preferably within a range of 20 to 500 wppm, such wt % based on total mass of the monomers, solvent, and catalyst fed to the polymerization reaction zone. A preferred chain transfer agent is hydrogen ($H_2$), however other chain transfer agents may also or instead be used (e.g., vinyl chloride, vinyl fluoride, vinyl bromide, aluminum alkyls, and/or deuterium, among others).

In particular embodiments, the (b) control of the polymerization so as to obtain the target Mooney Relaxation Area is based at least in part upon the molar ratio of the first metallocene catalyst to the second metallocene catalyst in the polymerization reaction. This may include, in continuous processes, maintaining or otherwise controlling molar feed rates of the catalysts to a polymerization reaction zone; or, in batch reactions, it may include providing the catalysts to the reaction zone in the desired molar ratios. In such embodiments, the target Mooney and Mooney Relaxation Area are obtained using catalyst ratios (molar ratio of first to second metallocene catalyst) within the range from 0.8:1 to 6:1, preferably 1:1 to 4:1 or 1:1 to 3.5:1, such as 1.5:1 to 2.5:1, 1:1 to 2:1, or 1.5:1 to 2:1, with ranges from any of the foregoing low ends to any of the foregoing high ends also contemplated in some embodiments.

The copolymer compositions obtained according to various of these embodiments are preferably ethylene-based copolymers (that is, ethylene is one of the monomers fed to the polymerization, such that the resulting composition includes ethylene-derived units). For instance, such compositions may comprise from 20 to 80 wt % ethylene-derived units, preferably from 45 to 60 (such as 45 to 55) wt % ethylene-derived units. The copolymer compositions may comprise from 0 to 10 wt %, preferably ranging from a low of any one of 0, 0.01, 0.05, 0.1, 3, and 4 to a high of any one of 6, 7, 8, 9, and 10 wt %, diene-derived units (preferably ENB-derived units); with the remainder of the copolymer composition comprising units derived from one or more $C_3$-$C_8$ α-olefins (preferably, propylene and/or 1-butene). Further, ranges from any of the foregoing low ends to any of the foregoing high ends also contemplated in some embodiments.

Further, the copolymer compositions according to some embodiments are bimodal in molecular weight distribution, meaning they contain a discrete low-Mooney fraction and discrete high-Mooney fraction. This bimodality may be shown through various properties; for instance, the copolymer compositions may have relaxation time τ (as determined in accordance with Small Amplitude Oscillatory Shear (SAOS) measurements detailed below) within the range from 3 to 10, preferably 4 to 6 seconds.

The high-Mooney copolymer compositions obtained according to various embodiments also or instead may be characterized as exhibiting any one or more of the following rheological and/or processability properties. These properties and their methods of measurement are defined in more detail below in the "Test Methods" section:

Phase angle (also referred to as loss angle) δ, measured at complex modulus $G^*=1.1\times10^5$ Pa, within the range from 10-45° or from 10-40°, preferably 10-30°, more preferably 10-25° or 15-25°, or alternatively from 0-45° (i.e., 45° or less);

Tan(δ) (measured at shear rate 0.245 Rad/s) within the range from 0.350 to 0.800, preferably 0.350 to 0.700, more preferably within the range from 0.350 to 0.600 or even 0.350 to 0.500;

Shear Thinning Ratio (STR) within the range from 200 to 500, more preferably within the range from 250 to 500, even more preferably 300 to 400, such as 350 to 400.

Among the above properties, ranges from any one of the low ends to any one of the high ends are also contemplated in various embodiments.

The high-Mooney copolymer compositions in accordance with any of the just-described embodiments may be particularly suitable as rubber components in thermoplastic vulcanizate (TPV) compositions. Thus, various embodiments of the present invention also contemplate TPV compositions comprising a high-Mooney copolymer composition in accordance with the above description.

Thermoplastic Vulcanizates Made from High-Mooney Copolymer Compositions

More particularly, some embodiments provide a TPV comprising an at least partially vulcanized disperse rubber phase (such rubber phase comprising and/or formed from the copolymer composition) within a continuous thermoplastic phase comprising a thermoplastic resin (e.g., a homopolypropylene). TPVs, thermoplastic resins, curing compositions, and optional additives for inclusion within a TPV, are described more fully in WIPO Publication WO 2016/064479, which reference is incorporated by reference herein.

In certain embodiments, the thermoplastic resin may be in accordance with any of those described in Paragraphs [0020]-[0024] of WIPO Publication WO 2016/064479, which description is hereby incorporated by reference (e.g., homopolypropylene or any other thermoplastic, including amorphous, crystalline, or semi-crystalline thermoplastics).

In particular embodiments, the copolymer composition is at least partially vulcanized by use of a curing composition, such as those described in Paragraphs [0025]-[0028] of WIPO Publication WO 2016/064479, which description is hereby incorporated by reference. In some embodiments, the copolymer composition is fully vulcanized.

As used herein, a "partially vulcanized" rubber is one wherein more than 5 wt % of the crosslinkable rubber is extractable in boiling xylene, subsequent to vulcanization (preferably dynamic vulcanization), e.g., crosslinking of the rubber phase of the TPV. For example, in a TPV comprising a partially vulcanized rubber at least 5 wt % and less than 10, 20, 30, or 50 wt % (in varying embodiments) of the crosslinkable rubber (e.g., a high-Mooney copolymer composition in accordance with some embodiments) is extractable from the specimen of the TPV in boiling xylene (said wt % based upon the total weight of rubber present in the TPV specimen). The percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight of the soluble components, other than the rubber to be vulcanized, such as extender oils, plasticizers, and components of the compositions soluble in organic solvent, as well as thermoplastic components that are not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition. A further description of the technique for determining the percentage of extractable rubber is set forth in Column 4, lines 19-50 of U.S. Pat. No. 4,311,628, which description is hereby incorporated by reference.

An "at least partially vulcanized" rubber has less than 50 wt % of the crosslinkable rubber extractable from a TPV specimen in boiling xylene, in accordance with the above description.

A "fully vulcanized" (or fully cured or fully crosslinked) rubber is one wherein less than 5 wt % of the crosslinkable rubber is extractable in boiling xylene, subsequent to vulcanization (preferably dynamic vulcanization), e.g., crosslinking of the rubber phase of the TPV. For example, in a TPV comprising a fully vulcanized rubber, less than 4, 3, 2, or even 1 wt % of the crosslinkable rubber is extractable from the specimen of the TPV in boiling xylene. In some embodiments, in a TPV comprising a fully vulcanized rubber, from 0.5 to 2.0 wt %, such as from 0.1 to 2.0 wt %, of the crosslinkable rubber is extractable from the specimen of the TPV in boiling xylene.

Thus, TPVs according to various embodiments may have less than 20, 15, 10, 5, 4, 3, 2, or even 1 wt % of crosslinkable rubber extractable in boiling xylene from a specimen of the TPV, and at least 0.0, 0.1, or 0.5 wt % rubber extractable in boiling xylene.

Finally, TPVs of some embodiments may further comprise any one or more optional additives, such as those described in Paragraphs [0074]-[0084] of WIPO Publication WO 2016/064479, which description is hereby incorporated by reference.

Producing Lower-Mooney Copolymer Compositions

According to yet other embodiments, another particular set of copolymer compositions may be obtained, wherein the copolymer compositions have relatively low Mooney viscosity, while also exhibiting both excellent processability and curability. This is somewhat surprising; typically, in metallocene-catalyzed polymers, to obtain superior processability requires broadening the molecular weight distribution by finding some means to obtain lower-Mooney fractions. However, when carrying out such processes with polymerizations including dienes, the low-Mooney fraction tends to adversely impact vulcanization (curing) properties. On the other hand, producing narrow composition distribution polymers results in more difficult processability, likely owing in part to the typically linear structure of such narrower composition distribution polymers.

The lower-Mooney polymer compositions obtained as described herein overcome this tension between cure properties and processability by exhibiting rheology consistent with long-chain branching, aiding in processability. Furthermore, it is believed that the incorporation of dienes into the copolymer chains (where dienes are included in the polymerization) is such that the dienes are distributed relatively evenly along the polymer chain, thereby enabling superior curability even with a smaller relative amount of diene. In other words, polymer compositions made using the dual catalyst polymerizations described herein may exhibit comparable or even superior curability even while having fewer diene-derived units as compared to incumbent Ziegler-Natta copolymer compositions.

Accordingly, processes of some embodiments include contacting a plurality of monomers with a first and second metallocene catalyst so as to obtain a copolymer composition having (i) Mooney viscosity within the range from 10 to 40 MU (ML, 1+4 @ 100° C.); (ii) Mooney Relaxation Area (MLRA) within the range from 100 to 500 MU-sec; and (iii) a corrected Mooney relaxation area (cMLRA) of 400 MU-sec or more, 600, 800, or 1000 MU-sec or more. Other embodiments further include (a) controlling the dual catalyst polymerization reaction so as to obtain a copolymer composition having Mooney viscosity within the range from 10 to 40 MU (ML, 1+4 @ 100° C.); and (b) controlling the polymerization such that the copolymer composition has Mooney Relaxation Area (MLRA) within the range from 100 to 500 MU-sec. Mooney viscosities of the just-described embodiments preferably range from 10 to 35, such as 12 to 35 MU (ML, 1+4 @ 100° C.); Mooney Relaxation (MLRA) is preferably within the range from 100 to 300 MU-sec.

With respect to (a), controlling the polymerization so as to obtain the desired Mooney viscosity may be in accordance with the high-Mooney copolymer composition embodiments previously discussed.

In certain embodiments, preferred polymerization reactor temperatures in these embodiments may range from 50° C. to 300° C., but preferably are within the range from 90° C. to 200° C., such as 95° C. to 150° C. Reactor pressures may range from 100 to 2000 psig, 250 to 1500 psig, such as 350 to 1000 psig, or 350 to 800 psig. And, chain transfer agent may be fed (e.g., in continuous polymerization processes) at a concentration in the feed up to 2 wt %, but preferably in a range of 50 to 500 ppm (said wt % based upon total mass of monomer, solvent, and catalyst feed). A preferred chain transfer agent is hydrogen ($H_2$); however, other chain transfer agents may also or instead be used, such as vinyl chloride, vinyl fluoride, vinyl bromide, or the like.

In particular embodiments, the (b) control of the polymerization so as to obtain the target Mooney Relaxation Area is based at least in part upon the molar ratio of the first metallocene catalyst to the second metallocene catalyst in the polymerization reaction. This may include, in continuous processes, maintaining or otherwise controlling molar feed rates of the catalysts to a polymerization reaction zone; or, in batch reactions, it may include providing the catalysts to the reaction zone in the desired molar ratios. The required molar ratio of catalyst may depend on the activity of each individual catalyst under the polymerization environment. Low ratio of the first metallocene catalyst to the second metallocene catalyst may produce polymer with relatively higher corrected Mooney relaxation area (cMLRA). In such embodiments, the target Mooney and Mooney Relaxation Area are obtained using catalyst ratios (molar ratio of first to second metallocene catalyst) within the range from 0.1:1 to 5:1, preferably 0.2:1 to 5:1 or 0.2:1 to 4:1, or even 0.2:1 to 3:1, with ranges from any of the foregoing low ends to any of the foregoing high ends also contemplated in various embodiments.

The overall polymer of the in-reactor blend depends on the amount of each individual component derived from the first and second metallocene catalysts. The fraction of each amount derived from the first and second metallocene catalysts, respectively, can be estimated by deconvoluton of the bimodal molecular weight distributions using two Flory distributions. Alternatively, the catalyst ratio is determined based on the catalyst activities. Preferably the amount of the polymer derived from the first catalyst is in a range of 20 to 60%, and the amount of polymer derived from the second catalyst is in a range of 30 to 80%.

The copolymer compositions obtained according to various of these embodiments are preferably ethylene-based copolymers (that is, ethylene is one of the monomers fed to the polymerization, such that the resulting composition includes ethylene-derived units). For instance, such compositions may comprise from 30 to 90 wt % ethylene-derived units, preferably from 50 to 80 (such as from 60 to 70) wt % ethylene-derived units. The copolymer compositions may comprise from 0 to 10 wt %, preferably ranging from a low of any one of 0, 0.01, 0.05, 0.1, 3, and 4 to a high of any one of 6, 7, 8, 9, and 10 wt %, diene-derived units (preferably ENB-derived units). However, in some particular embodiments, the copolymer compositions comprise no dienes (noting, however, that such copolymer compositions, when cured in accordance with some embodiments described below, should be cured using peroxides or other cure agents suitable for curing non-diene-containing copolymers). In yet other embodiments, the diene-derived units are ENB-derived units. In particular embodiments, such copolymer compositions comprise substantially no VNB-derived units. Some of the obtained properties are surprising in view of the lack of VNB, which was previously thought necessary to obtain the balance of processability and cure in some ethylene-based copolymer rubber compositions.

Finally, the remainder of the copolymer composition may comprise units derived from one or more $C_3$-$C_8$ α-olefins (preferably propylene and/or 1-butene).

Further, ranges from any of the foregoing low ends to any of the foregoing high ends also contemplated in some embodiments.

In addition, the copolymer compositions according to some embodiments have broad molecular weight distribution (MWD) due, e.g., to the use of dual catalysts and the high degree of long-chain branching in the copolymers. The broad MWD may be shown, for instance, by the relaxation time τ of such copolymers (which may be within the range from 40 to 80 seconds, preferably 50 to 70, such as 50 to 60, seconds, as measured by the SAOS testing described below).

The lower-Mooney copolymer compositions obtained according to various embodiments also or instead may be characterized as exhibiting any one or more of the following rheological and/or processability properties. These properties and their methods of measurement are defined in more detail below in the "Test Methods" section:

Phase angle (also referred to as loss angle) δ, measured at complex modulus $G^* = 1.1 \times 10^5$ Pa, within the range from 20-45°, preferably 25-40°, more preferably 28-40°, or alternatively from 0-45° (i.e., 45° or less);

Tan(δ) (measured at a frequency of 0.245 Rad/s) of 0.8 or less, 0.6 or less, 0.5 or less, or 0.4 or less; in other embodiments, Tan(δ) may be within the range from 0.500 to 0.800, such as 0.550 to 0.800, or preferably 0.500 to 0.700, such as 0.500 to 0.700;

STR within the range from 50 to 300, such as 75 to 250, preferably 150 to 250;

A cMLRA of 400 MU-sec or more, 600 or more, 800 or more, 1000 or more, or even 1200 or more.

Among the above properties, ranges from any one of the low ends to any one of the high ends are also contemplated in various embodiments.

Such relatively lower-Mooney copolymer compositions may be particularly suitable for use in creating cross-linked elastomer compounds, e.g., those made from typical EPDM rubber compound formulations. Applications of such compounds include in electrical applications (e.g., cabling/insulation), and also as a post-reactor modification to increase melt strength in LLDPE compositions. Amorphous (lower ethylene wt %) copolymer compositions of some embodiments may be useful in applications such as automotive brake pads and brake diaphragms. Higher crystallinity (higher ethylene wt %) copolymer compositions may be useful in high hardness profile applications.

Elastomer Compounds Made from Copolymer Compositions

The copolymer compositions of some embodiments, and in particular those having lower Mooney Viscosity (e.g., from 10 to 40 MU (ML, 1+4 @ 100° C.)) may be formulated and/or processed with any one or more various additives (e.g., curatives or cross-linking agents, fillers, process oils, and the like) to form elastomer compounds suitable for making articles of manufacture. For instance, compounds according to some such embodiments include, in addition to the copolymer composition, any components suitable for an EPDM formulation. For example, any of various known additives (fillers, plasticizers, compatibilizers, cross-linkers, and the like) may be formulated with the copolymer compositions of certain embodiments, providing an elastomeric compound or elastomeric formulation.

Where curatives, i.e., cross-linking agents or vulcanizing agents, are utilized, the copolymer composition may be present in the elastomeric compound in at least partially cross-linked form (that is, at least a portion of the polymer chains of the devolatilized elastomer composition are cross-linked with each other, e.g., as a result of a curing process typical for EPDM rubbers).

Accordingly, particular embodiments provide for an at least partially cross-linked elastomeric compound made by mixing a formulation comprising: (a) a copolymer composition (e.g., in accordance with any of the above-described embodiments, and in particular in accordance with the embodiments relating to copolymer compositions having 10 to 40 MU (ML, 1+4 @ 100° C.)); (b) one or more vulcanization activators; (c) one or more vulcanizing agents; and (d) optionally, one or more further additives.

Suitable vulcanization activators include one or more of zinc oxide, stearic acid, and the like. These activators may be mixed in amounts ranging from about 0 to 20 phr. As used herein, "phr" means parts per hundred parts rubber, where the "rubber" is taken as the elastomer composition. Thus, for activator to be formulated with elastomer composition at 15 phr, one would add 15 g activator to 100 g rubber. Unless specified otherwise, phr should be taken as phr on a weight basis. Different vulcanization activators may be employed in different amounts. For instance, where the vulcanization activator includes zinc oxide, the zinc oxide may be employed at amounts ranging from 1 to 20 phr, such as 2.5 to 10 phr (e.g., about 5 phr), while stearic acid may preferably be employed in amounts ranging from 0.1 to 5 phr, such as 0.1 to 2.0 phr (e.g., about 1.5 phr).

Any vulcanizing agent known in the art may be used. Of particular note are curing agents as described in Col. 19, line 35 to Col. 20, line 30 of U.S. Pat. No. 7,915,354, which description is hereby incorporated by reference (e.g., sulfur, peroxide-based curing agents, resin curing agents, silanes, and hydrosilane curing agents). Other examples include phenolic resin curing agents (e.g., as described in U.S. Pat. No. 5,750,625, also incorporated by reference herein). Cure co-agents may also be employed (e.g., as described in the already-incorporated description of U.S. Pat. No. 7,915,354).

The further additives (used in any compound and/or in an at least partially cross-linked elastomeric compound according to various embodiments) may be chosen from any known additives useful for EPDM formulations, and include, among others, one or more of:

- process oil, such as paraffinic process oil (examples including Sunpar™ 2280 (available from HollyFrontier Refining & Marketing LLC, Tulsa, Okla.); as well as Flexon™ 876, CORE™ 600 base stock oil, Flexon™ 815, and CORE™ 2500 base stock oil, available from ExxonMobil Chemical Company, Baytown, Tex.; process oil may be present in the formulation at 1-150 phr (when present), and preferred process oils have viscosity at 40° C. ranging from 80 to 600 CSt;
- vulcanization accelerators, present in the formulation at 0 to 15 phr, such as 1-5, or 2-4 phr, with examples including thiazoles such as 2-mercaptobenzothiazole or mercaptobenzothiazyl disulfide (MBTS); guanidines such as diphenylguanidine; sulfenamides such as N-cyclohexylbenzothiazolsulfenamide; dithiocarbamates such as zinc dimethyl dithiocarbamate, zinc diethyl dithiocarbamate, zinc dibenzyl dithiocarbamate (ZBEC); and zincdibutyldithiocarbamate, thioureas such as 1,3-diethylthiourea, thiophosphates and others;
- processing aids (e.g., polyethylene glycol or zinc soap);
- carbon black (e.g., having particle size from 20 nm to 600 nm and structure having DBPA (dibutyl phthalate absorption number) within the range from 0 to 150, as measured by the DBP method described in ASTM D2414), which may be present in the formulation at 0-500 phr, preferably 0-200 phr, such as within the range of 50-150 phr;
- mineral fillers (talc, calcium carbonate, clay, silica, aluminum trihydrate, and the like), which may be present in the formulation from 0 to 200 phr, preferably from 20 to 100 phr, such as in the range of 30 to 60 phr; and
- various other additives, such as antioxidants, stabilizers, anticorrosion agents, UV absorbers, antistatics, slip agents, moisture absorbents (e.g., calcium oxide), and pigments, dyes and other colorants.

As noted, the at least partially cross-linked elastomeric compounds of some embodiments are formed by mixing the above-described formulations. Mixing in these embodiments may include any one or more of typical mixing processes for EPDM compositions, such as open mill mixing, mixing using internal mixers or kneaders, and extrusion (e.g., through a twin-screw extruder).

Formulations comprising the lower Mooney copolymer compositions of various embodiments surprisingly exhibit much lower viscosity than would be expected from the Mooney viscosity of the copolymer compositions. This means that the formulation comprising such copolymer compositions are much more easily processed than one might typically expect.

One means of quantifying this phenomenon is by measuring the Mooney viscosity of the compound formed by mixing the formulations (referred to herein as "compound Mooney viscosity" or "compound ML"), and dividing such compound Mooney viscosity by the measured Mooney viscosity of the copolymer composition itself, giving the ratio compound Mooney viscosity to copolymer composition Mooney viscosity (which may be referred to in the shorthand as "Cpd Mooney/Copoly Mooney" or simply as "Mooney Ratio"). It should be noted that the compound Mooney is determined according to the below-described Mooney viscosity measurement procedure (see "Test Methods" section below). In addition, it is preferred that the same formulation be used for each copolymer composition being compared, when forming the compound for each respective copolymer composition being compared.

The compound viscosity of at least partially cross-linked elastomeric compounds in accordance with some embodiments is within the range from 20 to 60, preferably 25 to 45, even more preferably 25 to 40, MU (ML, 1+4 @ 100° C.).

The Cpd Mooney/Copoly Mooney for copolymer compositions of certain embodiments ranges from 1.0 to 2.0, preferably 1.0 to 1.8, most preferably from 1.0 to 1.50, such as 1.0 to 1.3. This indicates a relatively minor increase in viscosity for the compound vs. the polymer viscosity increase, which enables much easier processing (e.g., mixing to form compounds and/or molding to form a shaped article from such compounds, according to certain embodiments).

Test Methods

Small Amplitude Oscillatory Shear (SAOS); Phase Angle (otherwise known as loss angle) δ or delta; Shear Thinning Ratio; Shear Thinning Index (STI); Relaxation Time r; Large Amplitude Oscillatory Shear (LAOS); Mooney Large Viscosity (ML); Mooney Large Relaxation Area (MLRA); corrected MLRA (cMLRA); molecular weights (number average Mn, weight average Mw, and z-average Mz); and composition distribution are determined in accordance with the following description.

Small Amplitude Oscillatory Shear (SAOS):

Dynamic shear melt rheological data was measured using the ATD® 1000 Rubber Process Analyzer from Alpha Technologies. A sample of approximately 4.5 gm weight is mounted between the parallel plates of the ATD® 1000. The test temperature is 125° C., the applied strain is 14% and the frequency was varied from 0.1 rad/s to 200 rad/s. The complex modulus (G*), complex viscosity (q*) and the phase angle (δ) are measured at each frequency.

A nitrogen stream was circulated through the sample oven to minimize chain extension or cross-linking during the experiments. A sinusoidal shear strain is applied to the material. If the strain amplitude is sufficiently small the material behaves linearly. As those of ordinary skill in the art will be aware, the resulting steady-state stress will also oscillate sinusoidally at the same frequency but will be shifted by a phase angle δ (or delta) with respect to the strain wave. The stress leads the strain by δ (or delta). The phase angle δ, is the inverse tangent of the ratio of G" (shear loss modulus) to G' (shear storage modulus). For a typical linear polymer, the phase angle approaches 90° at low frequencies (or long times), since the polymer chains can relax quickly in the melt, absorbing energy and making G" much larger than G. With increasing frequency, the relaxation process is not fast, the polymer chains cannot absorb all the energy imparted in the shear oscillation, with the result the storage modulus G' increases relative to G". Eventually at the cross-over point, G' equals G" and the phase angle is 45°. At much higher frequencies (or short times), G' dominates the response over G", the phase angle approaches 0°, which is indicative of the plateau region. In contrast to linear polymers, branched polymer chains relax very slowly and cannot absorb the energy that is imparted even at very low frequencies, as a result the phase angle never approaches 90° at low frequency. In general, the phase angle at a specified frequency will be much lower for a branched polymer relative to a linear polymer. Similarly, the tan(δ) will be lower for a branched polymer as compared to that of a linear polymer.

Van Gurp Palmen:

The plot of the phase angle (δ) versus the complex modulus (G*) is known as the Van Gurp Palmen plot (M. Van Gurp, J. Palmen, Rheol. Bull., 67, pp 5-8, 1998). The phase angle is calculated at a G* of $10^5$ Pa for each polymer being analyzed. The plot of δ versus log (G*) was fitted to a third degree polynomial using the Least Squares method ($R^2 > 0.95$), and the polynomial equation was used to calculate δ at the specified G* value (e.g., $10^5$ Pa). The phase angle will decrease with higher degree of branching or increased polydispersity (molecular weight distribution, or MWD).

Shear Thinning Ratio:

Shear-thinning is a rheological response of polymer melts, where the resistance to flow (viscosity) decreases with increasing shear rate. The complex shear viscosity is generally constant at low shear rates (Newtonian region) and decreases with increasing shear rate. In the low shear-rate region, the viscosity is termed the zero shear viscosity, which is often difficult to measure for polydisperse and/or LCB polymer melts. At the higher shear rate, the polymer chains are oriented in the shear direction, which reduces the number of chain entanglements relative to their un-deformed state. This reduction in chain entanglement results in lower viscosity. Shear thinning is characterized by the decrease of complex dynamic viscosity with increasing frequency of the sinusoidally applied shear. Shear thinning ratio is defined as a ratio of the complex shear viscosity at frequency of 0.1 rad/sec to that at frequency of 128 rad/sec.

Shear Thinning Index:

Another method of quantifying shear-thinning is to use a parameter called the shear-thinning index (STI), defined as:

$$STI = ((\eta_{0.1\ rad/s} - \eta_{128\ rad/s})/\eta_{0.1\ rad/s})$$

where $\eta_{0.1\ rad/s}$ and $\eta_{128\ rad/s}$ are the complex shear viscosity at a frequency of 0.1 rad/s and 128 rad/s, respectively. The shear-thinning index typically increases with branching level; thus it is believed that for highly branched polymers (and/or polymer compositions that behave like highly branched polymers), the parameter STI approaches 1 since $\eta_{0.1\ rad/s} \gg \eta_{128\ rad/S}$. Conversely for Newtonian fluids, where the viscosity is independent of shear rate, STI approaches 0.

Relaxation Time:

Relaxation time τ may help indicate polydispersity/MWD and/or the presence long-chain branching in a polymer composition (or behavior of a polymer composition in a manner that emulates long-chain branched polymers). Relaxation time τ may be determined from the Cross Equation as used to model viscosity data collected over a range of frequencies. The viscosity data collected over a range of frequency can be fitted (e.g., via the least squares method) using the general form of the Cross Equation (J. M Dealy and K. F Wissbrun, Melt Rheology and Its Role in Plastics Processing Theory and Applications; Van Nostrand Reinhold: New York, p. 162 (1990):

$$\eta = \eta_\infty + (\eta_0 - \eta_\infty)/(1 + (\dot{\gamma}\tau)^{1-n})$$

where η is the dynamic viscosity, ηo is the limiting zero shear viscosity, $\eta_\infty$ the infinite shear viscosity, τ the relaxation time at the given frequency η, n the power law exponent describes the extent of shear thinning. For Newtonian fluid, n=1 and the dynamic complex viscosity is independent of frequency. For polymer of interest here, n<1, so that the enhanced shear thinning behavior is indicated by a decrease in n (increase in 1−n), and $\dot{\gamma}$ is the input shear frequency. The term $\eta_\infty$ is 0 from the curve fit, with the result the expression reduces to three parameters:

$$\eta = \eta_0/[1 + (\dot{\gamma}\tau)^{1-n}].$$

This expression gives the relaxation time when testing is conducted at constant strain and constant temperature (as noted above for SAOS measurements). As noted, the relaxation time, τ in the Cross Model can be associated to the polydispersity and/or long-chain branching in the polymer. For increased levels of branching (and/or polymer compositions emulating increased levels of branching), it is expected that τ would be higher compared to a linear polymer of the same molecular weight.

Large Amplitude Oscillatory Shear (LAOS):

The rheological properties of polymer compositions are studied using a rubber process analyzer (RPA) using a method according to the following description. Large Amplitude Oscillatory Shear (LAOS) can provide useful non-linear characteristics of polymers. LAOS can be described as the oscillatory strain domain where the shear complex modulus (G*) is a function of both the angular frequency and strain as compared with SAOS. LAOS tests are conducted using the ATD® 1000 rubber process analyzer commercialized by Alpha Technologies. The ATD® 1000 is a dynamic mechanical rheological tester designed for testing unfilled elastomers and compounds. Except where otherwise noted, Rheological tests using large amplitude oscillatory shear were carried out at a temperature of 125° C., strain amplitude of 1000% and frequency of 0.63 rad/sec. The input strain is represented by the function: $\gamma = \gamma_0 \sin(\omega t)$, where $\gamma_0$ is the strain amplitude. As can be seen, the function has a time dependence. The stress response of the polymer sample is measured using the following Fourier series, which is a function of time, angular frequency, and strain amplitude as shown below.

$$\sigma(t; \omega; \gamma_0) = \gamma_0 \sum_n \{G'(\omega, \gamma_0)\sin n\omega t + G''(\omega, \gamma_0)\cos n\omega t\}$$

G' and G" correspond to the real and imaginary components of the complex modulus, G*. Put another way, G' corresponds to the shear storage modulus (Pa), and G" to the shear loss modulus (Pa). The odd harmonics of this Fourier series ($G_1'$, $G_3'$, $G_5'$, etc.) are calculated by the RPA.

The long-chain branching (LCB) index is calculated according to the method described in Florian J. Stadlera, Adrien Leyguea, Henri Burhin, Christian Baillya, Polymer Reprints, 2008, 49(1) 121-122 (see also H. G. Burhin, N. Rossion, C. Bailly, A. Leygue, R. Kuenings, in FT Rheology and Large Amplitude Oscillatory Shear (LAOS), an interesting tool to study polymer architecture, International Rubber Conference IRC 2006, Lyon, France (2006); A. Leygue, N. Roisson, C. Bailly, R. Keunings, in Study of reversing flows of linear entangled polymers through constitutive models, AERC, Hersonisos, Crete, Greece (2006); and Burhin et. al., in XVth International Congress on Rheology, Monterey, Calif. (August 2008)). In particular, the following expressions are used:

$$LCB\ index = \frac{G_1'}{G_5'} - E_3$$

$$E_3 = \frac{5}{4} + \frac{1}{4}\left(\frac{G_2'}{G_5'}\right)^2 - \frac{1}{2}\frac{G_3'}{G_5'}$$

where, $G_1'$, $G_3'$ and $G_5'$ are the first, third and fifth harmonic associated with the real component G' of the complex modulus (G*). Higher LCB index typically indicates increased polymer branching.

Mooney Viscosity (ML and MST):

"Mooney viscosity" as used herein is the Mooney viscosity of a polymer or polymer composition. The polymer composition analyzed for determining Mooney viscosity should be substantially devoid of solvent. For instance, the sample may be placed on a boiling-water steam table in a hood to evaporate a large fraction of the solvent and unreacted monomers, and then, dried in a vacuum oven overnight (12 hours, 90° C.) prior to testing, in accordance with laboratory analysis techniques, or the sample for testing may be taken from a devolatilized polymer (i.e., the polymer post-devolatilization in industrial-scale processes). Unless otherwise indicated, Mooney viscosity is measured using a Mooney viscometer according to ASTM D-1646, but with the following modifications/clarifications of that procedure. First, sample polymer is pressed between two hot plates of a compression press prior to testing. The plate temperature is 150° C.+/−10° C. instead of the 50+/−5° C. recommended in ASTM D-1646, because 50° C. is insufficient to cause sufficient massing. Further, although ASTM D-1646 allows for several options for die protection, should any two options provide conflicting results, PET 36 micron should be used as the die protection. Further, ASTM D-1646 does not indicate a sample weight in Section 8; thus, to the extent results may vary based upon sample weight, Mooney viscosity determined using a sample weight of 21.5+/−2.7 g in the ASTM D-1646 Section 8 procedures will govern. Finally, the rest procedures before testing set forth in D1646 Section 8 are 23+/−3° C. for 30 min in air; ML as reported herein were determined after resting at 24+/−3° C. for 30 min in air. The results are reported as Mooney Units (ML, 1+4 @ 125° C.), where M is the Mooney viscosity number, L denotes large rotor (defined as ML in ASTM D1646-99), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 (ML, 1+4 @ 125° C.). Alternatively, the Mooney viscosity may be reported as 90 MU; in such instance, it should be assumed that the just-described method is used to determine such viscosity, unless otherwise noted. In some instances, a lower test temperature may be used (e.g., 100° C.), in which case Mooney is reported as Mooney Viscosity (ML, 1+4 @ 100° C.), or @ T° C. where T is the test temperature.

The torque limit of the Mooney viscometer is about 100 Mooney units (MU). Mooney values greater than about 100 Mooney units generally cannot be measured under these conditions. In this event, a non-standard rotor design is employed with a change in Mooney scale that allows the same instrumentation on the Mooney viscometer to be used for more viscous polymers. This rotor is both smaller in diameter and thinner than the standard ML rotor, and thus it is termed MST (Mooney Small-Thin). MST methods may be used to determine viscosity of polymers having viscosity greater than 100 Mooney units as described in Col. 5, lines 15-52 of U.S. Pat. No. 9,006,332, which description is incorporated herein by reference. In particular, MST may be determined and reported as (MST, 5+4 @ 200° C.), meaning a 5 minute pre-heat and 4-minute torque recording at 200° C. is used with the MST rotor. Further, if Mooney viscosity is reported herein as MU, MST, then it should be assumed unless otherwise noted that the just-described method for determining MST viscosity is used.

The MST rotor should be prepared as follows:
1. The rotor should have a diameter of 30.48+/−0.03 mm and a thickness of 2.8+/−0.03 mm (tops of serrations) and a shaft of 11 mm or less in diameter.
2. The rotor should have a serrated face and edge, with square grooves of 0.8 mm width and depth of 0.25-0.38 mm cut on 1.6 mm centers. The serrations will consist of two sets of grooves at right angles to each other (form a square crosshatch).
3. The rotor shall be positioned in the center of the die cavity such that the centerline of the rotor disk coincides with the centerline of the die cavity to within a tolerance of +/−0.25 mm. A spacer or a shim may be used to raise the shaft to the midpoint.
4. The wear point (cone shaped protuberance located at the center of the top face of the rotor) shall be machined off flat with the face of the rotor.

Mooney Relaxation Area (MLRA, MSTRA):

The MLRA and MSTRA data are obtained from the Mooney viscosity measurement (ML and MST, respectively, as applicable) when the rubber relaxes after the rotor is stopped. Each of the MLRA and the MSTRA is the integrated area under the Mooney torque-relaxation time curve from 1 to 100 seconds. MLRA and MSTRA are each a measure of chain relaxation in molten polymer and can each be regarded as a stored energy term which suggests that, after the removal of an applied strain, the longer or branched polymer chains can store more energy and require longer time to relax. Therefore, the MLRA or MSTRA value of a bimodal rubber (the presence of a discrete polymeric fraction with very high molecular weight and distinct composition) or a long chain branched rubber are larger than a broad or a narrow molecular weight rubber when compared at the same Mooney viscosity values (ML or MST, respectively).

Mooney Relaxation Area (MLRA or MSTRA) is dependent on the Mooney viscosity of the polymer, and increases with increasing Mooney viscosity. In order to remove the dependence on polymer Mooney Viscosity in the case of ML-based Mooney viscosities, a corrected MLRA (cMLRA) parameter may be used, where the MLRA of the polymer is normalized to a reference of 80 Mooney viscosity. The formula for cMLRA is provided below:

$$cMLRA = MLRA\left(\frac{80}{ML}\right)^{1.44},$$

where MLRA and ML are the Mooney Relaxation Area and Mooney viscosity of the polymer sample measured at 125° C. Similarly, a cMSTRA can be used, derived from a similar correlative equation, with MST in place of ML, and adjustment of the correlative numbers:

$$cMSTRA = MSTRA\left(\frac{50}{MST}\right)^{1.44},$$

Alternatively, the ratio MLRA/ML may be used to encompass both the MLRA and ML data, in view of MLRA's dependence upon ML (although it should be noted this does not remove the dependency of MLRA on ML; it simply ensures that both terms are encompassed). Such measurement may be particularly useful where comparing polymers with Mooney viscosities within 10% of one another. Similarly, the ratio MSTRA/MST may be used to encompass both the MSTRA and MST data, in view of MSTRA's dependence upon MST, particularly when comparing polymers with Mooney viscosities within 10% of one another. Each ratio has the dimension of time. A higher MLRA/ML (or MSTRA/MST) number signifies a higher degree of melt elasticity for materials with similar value of ML or MST, as applicable. Long chain branching will slow down the relaxation of the polymer chain, hence increasing the value of MLRA/ML or MSTRA/MST.

Molecular Weight and Composition Distribution:

Molecular weights (number average molecular weight (Mn), weight average molecular weight (Mw), and z-average molecular weight (Mz)) are determined using a Polymer Laboratories Model 220 high temperature GPC-SEC (gel permeation/size exclusion chromatograph) equipped with on-line differential refractive index (DRI), light scattering (LS), and viscometer (VIS) detectors. It uses three Polymer Laboratories PLgel 10 m Mixed-B LS columns for separation using a flow rate of 0.54 ml/min and a nominal injection volume of 300 microliter. The detectors and columns were contained in an oven maintained at 145° C. The stream emerging from the SEC columns was directed into the miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun et al., in Macromolecules, Volume 34, Number 19, pp. 6812-6820, (2001), incorporated herein by reference.

Solvent for the SEC experiment was prepared by dissolving 6 grams of butylated hydroxy toluene (BHT) as an antioxidant in 4 liters of Aldrich reagent grade 1, 2, 4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC. Polymer solutions were prepared by placing dry polymer in a glass container, adding the desired amount of BHT stabilized TCB, then heating the mixture at 160° C. with continuous agitation for about 2 hours. All quantities were measured gravimetrically. The TCB densities used to express the polymer concentration in mass/volume units are 1.463 g/mL at 22° C. and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc)=0.1048 for ethylene-propylene copolymers, and (dn/dc)=0.01048-0.0016ENB for EPDM, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers. Units of parameters used throughout this description of the SEC method are: concentration is expressed in g/cm³, molecular weight is expressed in g/mol, and intrinsic viscosity is expressed in dL/g.

The light scattering (LS) detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2$=0.0015 for ethylene homopolymer and $A_2$=0.0015-0.00001EE for ethylene-propylene copolymers, where EE is the ethylene content in weight percent in the ethylene-propylene copolymer. $P(\theta)$ is the form factor for a mono-disperse random coil, and $K_o$ is the optical constant for the system:

$$K_0 = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=690 nm. For purposes of this application, where DRI and LS measurements conflict, LS measurements should be used for Mw and Mz, while DRI measurements should be used for Mn. And, although MWD (polydispersity) is taken as Mw/Mn, where DRI and LS measurements conflict, MWD should be determined as Mw (measured by LS)/Mn (measured by DRI), or $Mw_{LS}/Mn_{DRI}$.

Molecular Weight Distribution and Composition Distribution by GPC-IR:

Where indicated, GPC-IR may instead be used to determine the distribution and the moments of molecular weight (e.g., Mn, Mw, Mz, etc.) and/or the comonomer distribution (C2, C3, C6, etc.). According to the GPC-IR procedure, distribution and moments of molecular weight and/or comonomer distribution are determined with a high temperature Gel Permeation Chromatography (PolymerChar GPC-IR) equipped with a multiple-channel band filter based infrared detector ensemble IR5, in which a broad-band channel is used to measure the polymer concentration while two narrow-band channels are used for characterizing composition. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 micrometer Teflon filter and degassed with an online degasser before entering the GPC instrument. The nominal flow rate is 1.0 mL/min and the nominal injection volume is 200 microliter. The whole system including transfer lines, columns, detectors are contained in an oven maintained at 145° C. Given amount of polymer sample is weighed and sealed in a standard vial with 10 microliter flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hour for PP samples. The TCB densities used in concentration calculation are 1.463 g/ml at 22° C. and 1.284 g/ml at 145° C. The sample solution concentration is from 0.2 to 2.0 mg/ml, with lower concentrations being used for higher molecular weight samples.

The concentration, c, at each point in the chromatogram is calculated from the baseline-subtracted IR5 broadband signal, I, using the following equation:

$$c = \alpha I,$$

where α is the mass constant determined with PE standard NBS1475. The mass recovery is calculated from the ratio of the integrated area of the concentration chromatography over elution volume and the injection mass which is equal to the pre-determined concentration multiplied by injection loop volume.

The molecular weight is determined by combining universal calibration relationship with the column calibration which is performed with a series of mono-dispersed polystyrene (PS) standards. The molecular weight is calculated at each elution volume with following equation:

$$\log M_X = \frac{\log(K_X/K_{PS})}{a_X + 1} + \frac{a_{PS} + 1}{a_X + 1} \log M_{PS},$$

where K and α are the coefficients in the Mark-Houwink equation. The variables with subscript "X" stand for the test sample while those with subscript "PS" stand for polystyrene. In this method, $a_{PS}=0.67$ and $K_{PS}=0.000175$ while $a_X$ and $K_X$ are determined based on the composition of linear ethylene/propylene copolymer and linear ethylene-propylene-diene terpolymers using a standard calibration procedure. See T. Sun, P. Brant, R. R. Chance, and W. W. Graessley, "Effect of Short Chain Branching on the Coil Dimensions of Polyolefins in Dilute Solution," Macromolecules, Volume 34, Number 19, pp. 6812-6820, (2001). The comonomer composition is determined by the ratio of the IR detector intensity corresponding to $CH_2$ and $CH_3$ channel calibrated with a series of PE and PP homo/copolymer standards whose nominal value are predetermined by NMR.

Either GPC-SEC or GPC-IR may be used to determine molecular weights, molecular weight distributions, and/or composition distributions, as specified in context herein. Where neither method is specified, or where results of the two methods conflict, it is preferred to use the GPC-SEC method detailed above.

Ethylene Content:

Ethylene content is determined using FTIR according the ASTM D3900 and is not corrected for diene content unless the ethylene content measurement is specifically stated as "correct" or "corr" or the like. ENB is determined using FTIR according to ASTM D6047. The content of other diene if present can be obtained using $C^{13}$ NMR. Corrected ethylene wt % s are calculated as follows, where a corrected measurement is indicated: (% C2 (uncorr)/(100+% diene) *100).

EXAMPLES

Example 1

Polymerizations were carried out using a solution process in a 1.0-liter continuous stirred-tank reactor (autoclave reactor). The autoclave reactor was equipped with a stirrer, a water-cooling/steam-heating element with a temperature controller, and pressure controller. Isohexane was used as a solvent. It was fed into the reactor using a Pulsa pump and its flow rate was controlled by adjusting the outflow at the pump (using a calibration curve). The compressed, liquefied propylene feed was controlled by a mass flow controller. Ethylene was mixed with propylene before the reactor and fed to the manifold. A mixture of isohexane and tri-n-octylaluminum (TNOAL) and 5-ethylidene-2-norbornene (ENB) was also added to the manifold through a separate line and the combined mixture of monomers and solvent was fed into the reactor using a single tube.

Catalyst solution included Catalyst A (1,1'-bis(4-triethylsilylphenyl)methylene-(cyclopentadienyl)(2,7-di-tertiary-butyl-fluoren-9-yl)hafnium dimethyl) and, where indicated in Tables 1.1-1.3 below, Catalyst B (cyclotetramethylenesilylene-bis(4,7-dimethylinden-1-yl)hafnium dimethyl). Each catalyst was pre-activated with either Activator C (N,N-dimethylanilinium tetrakis(perfluoronaphthyl)borate) or Activator D (N,N-dimethylanilinium tetrakis (pentafluorphenyl)borate), as indicated in Tables 1.1-1.3 below, at a molar ratio of about 1:1 in 900 ml of toluene.

Isohexane and monomers (e.g., ethylene and propylene) were purified over beds of alumina and molecular sieves. Toluene for preparing catalyst solutions was purified by the same technique.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

Polymerization reaction conditions, and catalyst/activators used, are set forth below in Tables 1.1-1.3.

TABLE 1.1

Experimental Conditions for Example 1 Polymerizations

| Sample | Catalyst 1 | Activator 1 | Catalyst 2 | Activator 2 | Rxr Temp (° C.) | Rxr P (PSIG) | Ethylene Feed (g/min) | Propylene Feed (g/min) |
|---|---|---|---|---|---|---|---|---|
| 1-1 | Cat A | Act C | Cat B | Act C | 110 | 320 | 6 | 6 |
| 1-2 | Cat A | Act C | Cat B | Act C | 110 | 320 | 4 | 8 |
| 1-3 | Cat A | Act C | Cat B | Act C | 110 | 320 | 6 | 6 |
| 1-4 | Cat A | Act C | Cat B | Act C | 110 | 320 | 6 | 6 |
| 1-C1 | Cat A | Act D | | | 100 | 320 | 3 | 6 |

TABLE 1.1-continued

Experimental Conditions for Example 1 Polymerizations

| Sample | Catalyst 1 | Activator 1 | Catalyst 2 | Activator 2 | Rxr Temp (° C.) | Rxr P (PSIG) | Ethylene Feed (g/min) | Propylene Feed (g/min) |
|---|---|---|---|---|---|---|---|---|
| 1-C2 | Cat A | Act D | | | 100 | 320 | 3 | 6 |
| 1-C3 | Cat A | Act D | | | 100 | 320 | 2.4 | 5 |

TABLE 1.2

Additional Experimental Conditions for Example 1 Polymerizations

| Sample | ENB Feed (g/min) | Activated Catalyst 1 Feed (mol/min) | Activated Catalyst 2 Feed (mol/min) | Ratio A/B | Scavenger Feed (mol/min) | Iso-hexane Feed (g/min) | Prod C2 (wt %) uncorrected | Prod C2 (wt %) corrected |
|---|---|---|---|---|---|---|---|---|
| 1-1 | 1.5 | $2.12 \times 10^{-7}$ | $6.24 \times 10^{-8}$ | 3.4 | | 57.7 | 61.0 | 57.4 |
| 1-2 | 1.5 | $1.41 \times 10^{-7}$ | $4.16 \times 10^{-8}$ | 3.4 | | 57.7 | 56.3 | 53.1 |
| 1-3 | 1.5 | $2.12 \times 10^{-7}$ | $6.24 \times 10^{-8}$ | 3.4 | | 57.7 | 49.5 | 46.7 |
| 1-4 | 1.5 | $2.31 \times 10^{-7}$ | $1.36 \times 10^{-7}$ | 1.7 | | 57.7 | 59.7 | 55.9 |
| 1-C1 | 1.11 | $8.91 \times 10^{-8}$ | — | NA | $7.37 \times 10^{-6}$ | 82.3 | 52.0 | 49.1 |
| 1-C2 | 1.11 | $1.02 \times 10^{-7}$ | — | NA | $7.37 \times 10^{-6}$ | 82.3 | 51.5 | 48.6 |
| 1-C3 | 0.85 | $5.88 \times 10^{-8}$ | — | NA | $7.37 \times 10^{-6}$ | 82.1 | 51.4 | 49.0 |

TABLE 1.3

Additional Experimental Conditions for Example 1 Polymerizations

| Sample | Polymer ENB (wt %) | Polymer (g/min) | Cat Efficiency (g poly/g cat) | MST | MSTRA | Steady State Reactor wt % C2 | Steady State Reactor wt % C3 | Steady State Reactor wt % ENB |
|---|---|---|---|---|---|---|---|---|
| 1-1 | 0.059 | 7.5 | 31611 | 53 | 536.1 | 2.41 | 5.00 | 1.63 |
| 1-2 | 0.057 | 2.1 | 13429 | 56.7 | 743.3 | 4.04 | 10.61 | 2.05 |
| 1-3 | 0.056 | 4.5 | 18878 | 32.2 | 295.7 | 2.69 | 8.74 | 1.86 |
| 1-4 | 0.063 | 7.9 | 26712 | 35.8 | 491.8 | 2.22 | 4.63 | 1.54 |
| 1-C1 | 0.054 | 1.8 | 21194 | 60.8 | 496.8 | 2.30 | 5.81 | 1.14 |
| 1-C2 | 0.057 | 1.7 | 17894 | 58.7 | 387.2 | 2.34 | 5.84 | 1.14 |
| 1-C3 | 0.046 | 1.2 | 20955 | 56.5 | 372.3 | 1.98 | 4.99 | 0.89 |

The rheology of Samples 1-1 through 1-4 were measured in accordance with the above-described Test Methods, and compared to similarly measured rheology properties of Comparative Sample 1-C1 and to similarly measured rheology properties of Comparative Samples 1-C4 and 1-C5. Sample 1-C4 corresponds to Ziegler-Natta catalyzed Vistalon™ 3666 grade EPDM terpolymers (ExxonMobil Chemical Company, Houston, Tex.) with 75 phr extension oil (60.5 MU (MST, 5+4 @ 200° C.), and 752 MSTRA), and Sample 1-C5 corresponds to Vistalon 3666 without any extension oil. The rheology measurements are shown in Table 2.

TABLE 2

Rheology Properties for Example 1 Samples

| Sample | Phase angle (δ) @ $G^* = 1.1 \times 10^5$ Pa (degrees) | Tan (δ) @ 0.245 Rad/s | $\eta^*$ @ 0.1 Rad/s (Pa · sec) | $\eta^*$ @ 128 Rad/s (Pa · sec) | Shear Thinning Ratio (STR) |
|---|---|---|---|---|---|
| 1-C4 | 30.31 | 0.857 | 270,873 | 2,006 | 135 |
| 1-C5 | 40.55 | 0.715 | 1,618,281 | 6,758 | 239 |
| 1-1 | 32.77 | 0.592 | 2,093,880 | 7,682 | 273 |
| 1-2 | 41.12 | 0.772 | 1,091,492 | 5,086 | 215 |
| 1-3 | 35.13 | 0.698 | 878,925 | 4,140 | 212 |
| 1-4 | 20.32 | 0.391 | 1,991,489 | 5,291 | 376 |
| 1-C1 | 51.99 | 0.986 | 1,275,676 | 6,720 | 190 |

In addition, FIG. 1 shows a plot of complex viscosities vs. shear frequency for all samples set forth in Table 2. As shown in FIG. 1, Sample 1-C1 and Samples 1-1, 1-2, and 1-4 have similar complex viscosities across a range of shear frequencies, while Sample 1-3 exhibits markedly lower complex viscosity across the entire range of shear frequencies, approaching the lowest complex viscosity (shown by Sample 1-C4, which is extended with 75 phr oil). Advantageously, Samples 1-3 and 1-2 exhibit generally lower complex viscosities than the non-oil-extended Sample 1-C5. However, more importantly, Samples 1-1 and 1-4 exhibit by far the greatest STI values, as shown in Table 2. Further, all inventive samples showed superior STI to the oil-extended 1-C4, and either superior or comparable STI to the higher-Mooney Sample 1-C5, indicating improved processability.

Figure 2:
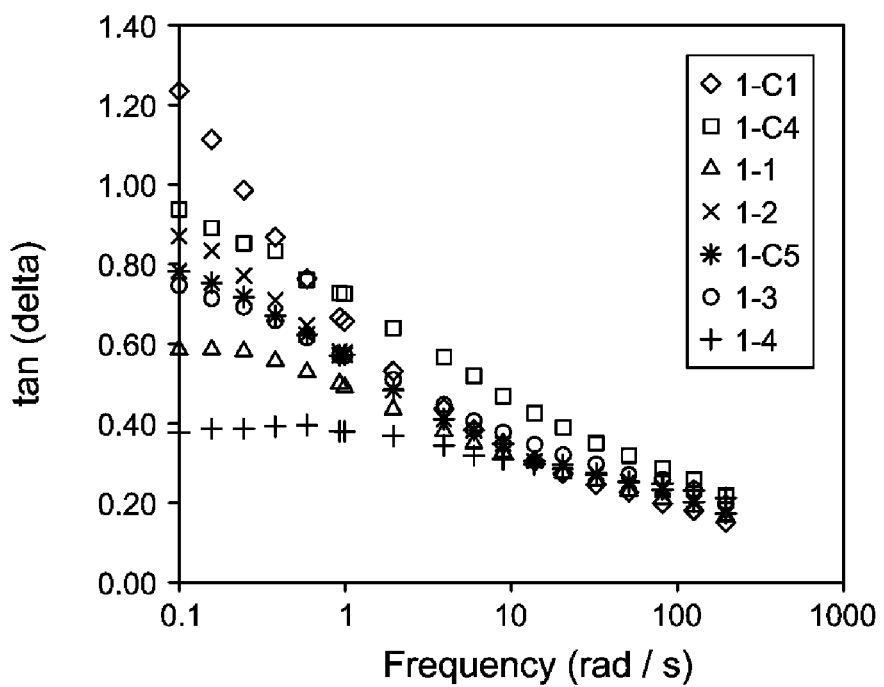
FIG. 2 is a plot of tan($\delta$) vs. shear frequency for samples in accordance with Example 1.

FIG. 2 is a plot of the tan(δ) vs. shear frequency for the samples of Table 2. This plot approximates the relative elasticities of the samples. As with the complex viscosities, Samples 1-1 and 1-2 flank the sample 1-C5 (the non-oil-extended commercial comparator). Sample 1-3 also shows a close match in elasticity, while Sample 1-4 shows significantly greater elasticity. The linear comparator made with only Catalyst A (1-C1) shows significantly lower elasticity.

Figure 3:
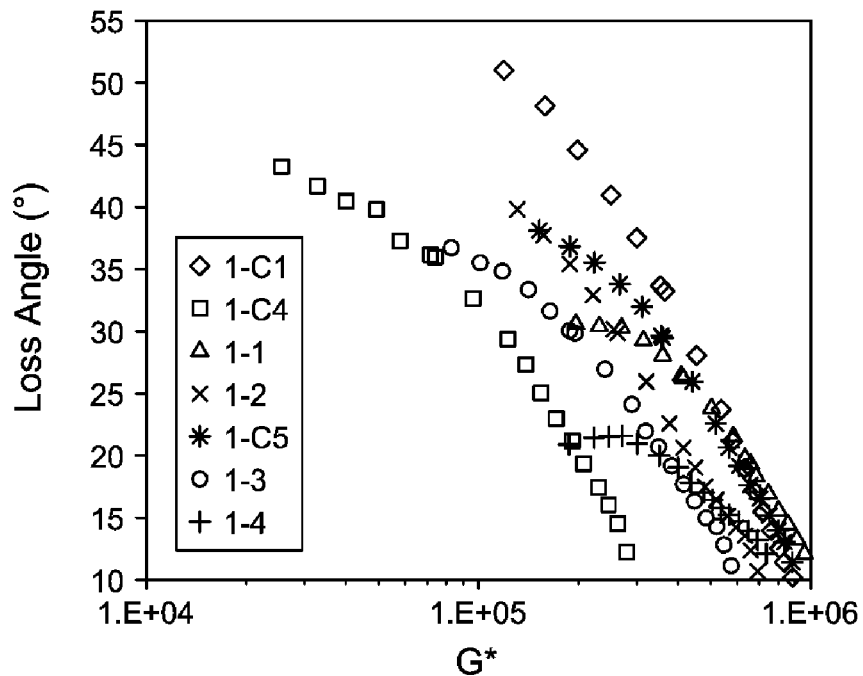
FIG. 3 is a Van-Gurp Palmen plot of samples in accordance with Example 1.

FIG. 3 shows the Van-Gurp Palmen plot. Plateaus in this plot are a signature of long chain branching. In addition, lower loss angle (delta) indicates greater elasticity in the sample. Clear plateaus are seen for inventive Samples 1-1 and 1-4. Curvature is seen for other inventive samples 1-2 and 1-3, although to a much lesser degree than is seen for the linear sample (1-C1). Comparison of the loss angle at $G^*=1.1\times10^5$ ranks the samples' elasticity (as summarized in Table 2). Inventive samples have similar or greater levels of elasticity as compared to the commercial Sample 1-C5. Surprisingly, Sample 1-4 even exhibits similar elasticity to the oil-extended commercial sample 1-C4, even though Sample 1-4 is not oil-extended.

Example 2

Polymerizations were carried out in the same manner as described with respect to Example 1. Both catalyst A and Catalyst B were preactivated with activator C in 900 ml of toluene at a molar ratio of about 1:1. The detailed polymerization process conditions and some characteristic properties are listed in Table 3. The scavenger feed rate was adjusted to optimize the catalyst efficiency and the feed rate varied from 0 (no scavenger) to 15 μmol/min. The catalyst feed rates may also be adjusted according to the level of impurities in the system to reach the targeted conversions listed. Corrected ethylene wt % s were calculated (% C2 (uncorr)/(100+% diene)*100), and are reported as indicated below. GPC-IR as previously described was used to determine the molecular weight. A rubber process analyzer was used as previously described to obtain the shear rheology at a temperature of 125° C. and a strain rate of 14% in Table 3 below; ML, MLRA, and cMLRA were calculated as described hereinabove. In addition, select rheological data for comparative Sample 2-C is also reported in Table 3. Sample 2-C is a commercial Vistalon™ 1703P EPDM rubber, available from ExxonMobil Chemical Company (Houston, Tex.). Vistalon™ 1703P is selected as a comparator due to its good cure properties and ready processability in rubber formulations.

TABLE 3

Example 2 Polymerization conditions and data

|  | Sample | | |
| --- | --- | --- | --- |
|  | 2-1 | 2-2 | 2-C |
| Polymerization temperature (° C.) | 120 | 120 | — |
| Ethylene feed rate (SLPM) | 6 | 6 | — |
| propylene feed rate (g/min) | 6 | 6 | — |
| ENB feed rate (ml/min) | 1.8 | 1.8 | — |
| Isohexane feed rate (g/min) | 82.7 | 82.7 | — |
| Catalyst A feed rate (mol/min) | 1.884E−07 | 1.610E−07 | — |
| Catalyst B feed rate (mol/min) | 8.249E−08 | 1.100E−07 | — |
| Molar Ratio A:B | 2.28 | 1.46 | — |
| Conversion (%) | 38.9% | 43.5% | — |
| Ethylene (wt %-corr) | 65.4 | 64.9 | — |
| ENB (wt %) | 5.99 | 6.28 | — |
| η @ 0.1 rad/s (Pa · sec) | 337121 | 114376 | 175596 |
| η @ 0.245 rad/s (Pa · sec) | 168491 | 64073 | — |
| η @ 128 rad/s (Pa · sec) | 2224 | 1482 | 890 |
| Shear Thinning Index | 0.9934 | 0.9870 | 0.9949 |
| Shear Thinning Ratio | 152 | 77.2 | 197 |
| tan delta @ 0.245 rad/s | 0.551 | 0.773 | 0.636 |
| phase angle (delta) @G* = 110,000 Pa (degrees) | 29 | 36.7 | 27.9 |
| ML (mu) | 28.9 | 15.2 | — |
| MLRA (mu-sec) | 292.5 | 115.3 | — |
| cMLRA (mu-sec) | 1,267.3 | 1,260.2 | — |
| Mw_GPC-IR (g/mol) | 164,524 | 109,412 | — |

Figure 4:
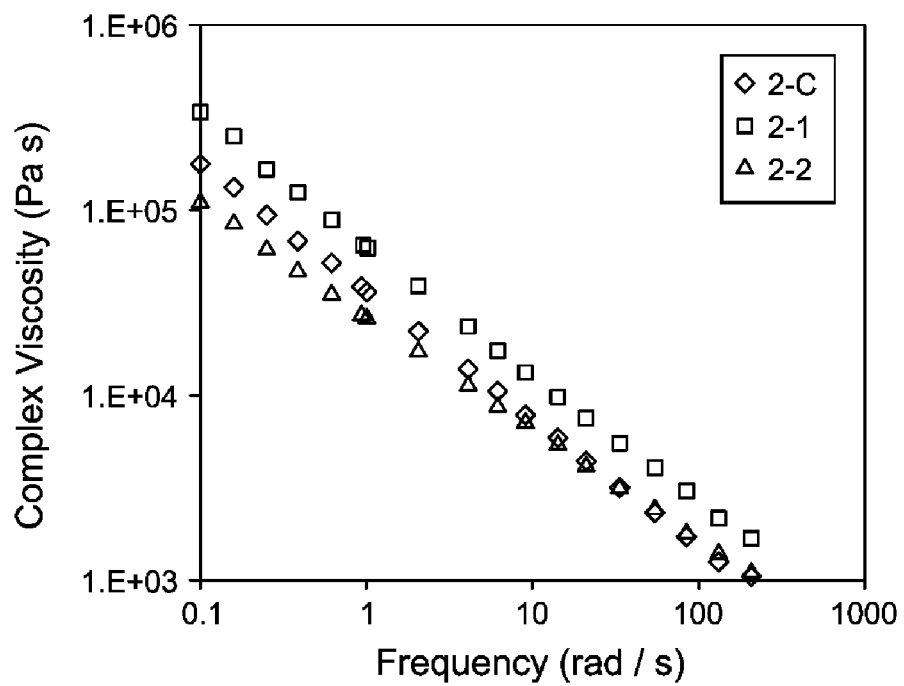
FIG. 4 is a plot of complex viscosities vs. shear frequency for samples in accordance with Example 2.

In addition, complex viscosities for Samples 2-1, 2-2, and 2-C are plotted in FIG. 4. The two inventive samples flank Sample 2-C, with Sample 2-1 having the higher viscosity but a similar shear-thinning index.

Figure 5:
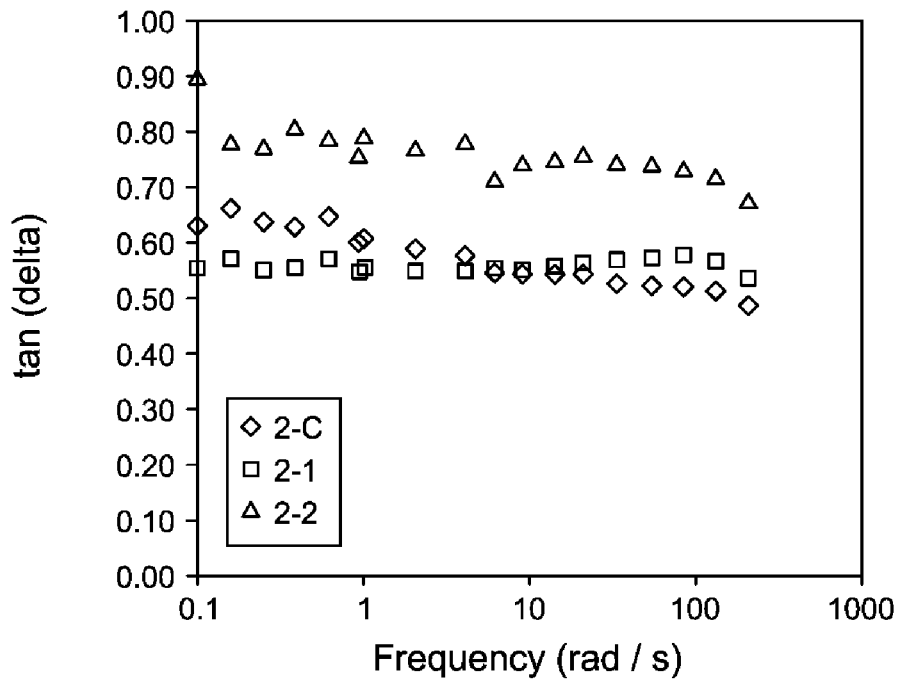
FIG. 5 is a plot of tan($\delta$) vs. shear frequency for samples in accordance with Example 2.

FIG. 5 shows tan(delta) vs. frequency for the samples, indicating relative elasticity of the samples (with lower tan(delta) indicating greater elasticity). Sample 2-1 has substantially overlapping tan(delta) values, indicating a very similar elasticity to Sample 2-C.

Figure 6:
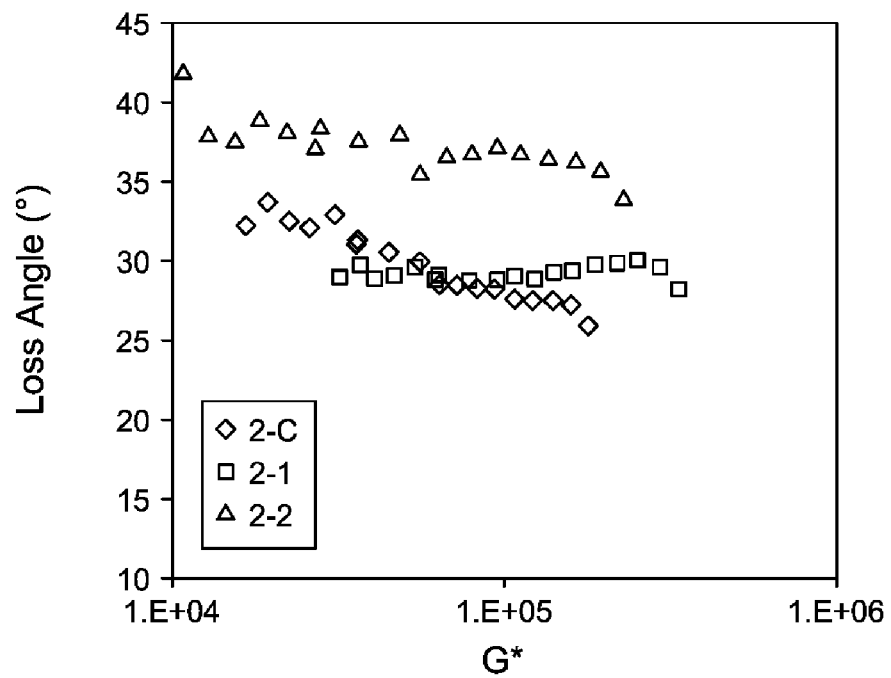
FIG. 6 is a Van-Gurp Palmen plot of samples in accordance with Example 2.

FIG. 6 is the Van Gurp-Palmen Plot. Plateaus in this plot are a signature of long chain branching. In addition, lower loss angle (delta) indicates greater elasticity in the sample. Clear plateaus are seen for the two inventive samples and Sample 2-C; in addition, Sample 2-1 shows even lower loss angle than Sample 2-C at some values of G*, indicating similar or even greater elasticity.

Example 3

Representative EPDM compound formulations containing polymer (Sample 2-1, Sample 2-2, or one of the comparative Samples 3-C1, 3-C2 and 3-C3), carbon black, oil and curatives were prepared in a 410 cc Banbury® Mixer. Sample 3-C1 is Vistalon™ 2504; Sample 3-C2 is Vistalon™ 2502, and Sample 3-C3 is Vistalon™ 722. These comparators were selected for the comparisons of compounding data of Example 3 because of the use of a sulfur cure (Sample 2-C, which contains VNB, is not sulfur curable).

Table 4 shows the representative EPDM formulation. A conventional mix was adopted for compounding using a fill factor of 70%. At the start of the mix, the chamber was filled with polymer. Carbon black, oil, zinc oxide and stearic acid were added gradually to the mixer. After the mix had homogenized, the mixing speed was reduced to 80 rpm to control the temperature. Mixing was continued for 3 minutes, after which the resulting masterbatch was discharged from the Banbury mixer. The temperature of the discharged batch on an average was about 140° C.

In addition, the curatives (sulfur, ZBEC, MBTS, Rhenocure™ ZADT/G and Rhenocure™ TP/G) were added to the masterbatch on a two roll mill. The batch was passed several times through the mill to ensure a homogeneous dispersion of the curatives. Prior to cure, a 5 g sample of each compound was isolated for rheology measurements (which tests were conducted at 100° C. so as to avoid curing the compounds). The batches containing the curatives were then cured in an electric press and tested for various physical and mechanical properties.

TABLE 4

Example 3 Representative EPDM Formulation

| | |
|---|---|
| Polymer (2-1, 2-2, 3-C1, 3-C2, or 3-C3) | 100 |
| Carbon Black N550 | 130.0 |
| Sunpar™ 2280 | 70.0 |
| Zinc Oxide | 5.0 |
| Stearic Acid | 1.0 |
| Sulphur | 0.1 |
| Mill Addition Entire Batch | |
| Sulfur | 1.1 |
| ZBEC (70% active) | 1.5 |
| MBTS (80%) | 1.5 |
| Rhenocure ™ ZADT/G (50% ACTIVE) | 1.54 |
| Rhenocure ™ TP/G (50% ACTIVE) | 1.8 |
| Specific Gravity | 4.14 g/cm$^3$ |
| Total PHR master batch | 306.0 |
| Total PHR compound | 313.5 |
| Batch Factor | 1.05 |
| Fill (%) | 70 |
| Batch wt. (gm) | 327.7 |

*Unless otherwise noted, all values are in phr (parts per hundred parts resin), based on the addition of 100 parts polymer as indicated.

In Table 4, Carbon Black N550 is carbon black. Sunpar™ 2280 is a paraffinic processing oil; Zinc Oxide is Zinc Oxide; ZBEC is zinc di-benzyl dithiocarbamate; MBTS is 2-mercaptobenzothiazole disulfide; Rhenocure™ ZADT/G is zinc amine dithiophosphate (50% active ingredient), commercially available from RheinChemie; Rhenocure™ TP/G is zinc dialkyl dithiophosphate containing 50% active ingredient, commercially available from RheinChemie. Batch Factor is a sizing factor useful in converting the above recipe (in phr) to weight of ingredients for use in compounding. Specifically, the phr of each ingredient is multiplied by the batch factor to provide the weight of that ingredient to be used in the compounding.

Table 5 illustrates the compound rheology properties of the compounds made according to the representative formulation of Table 4 (with each of the polymer samples 2-1, 2-2, 3-C1, and 3-C2). Compound rheology was not measured for Sample 3-C3 since the cure tests were conducted using a sulfur cure (which will not cure a copolymer lacking diene, such as Sample 3-C3).

TABLE 5

Compound Rheology Properties of Example 3

| Property | Units | 3-C1 | 3-C2 | 2-1 | 2-2 |
|---|---|---|---|---|---|
| Compound Viscosity (ML, 1 + 4 @ 100° C.) | MU | 49 | 41 | 36 | 28 |
| Polymer ML | MU | 25.0 | 25.0 | 29.0 | 15.0 |
| Mooney Ratio | | 1.95 | 1.65 | 1.25 | 1.88 |
| Compound SAOS 100° C., 14% strain | | 49 | 41 | 36 | 28 |
| Tan Delta @ 0.245 Rad/s | | 1.119 | 1.119 | 0.836 | 1.088 |
| Viscosity @ 0.245 Rad/s | Pa · sec | 2.5 × 10$^5$ | 2.8 × 10$^5$ | 3.2 × 10$^5$ | 2.3 × 10$^5$ |
| Shear Thinning Index (STI) | | 0.994 | 0.996 | 0.997 | 0.997 |
| Mooney Scorch at 125° C. | | | | | |
| Min Viscosity | MU | 18 | 17 | 15 | 12 |
| t10 – t5 | min | 1.60 | 1.89 | 1.67 | 1.53 |
| t5 – t1 | min | 4.83 | 4.83 | 3.76 | 3.84 |
| Ms t1 | min | 8.55 | 10 | 9.02 | 8.98 |
| Ms t5 | min | 13.38 | 14.83 | 12.78 | 12.82 |
| Ms t10 | min | 14.98 | 16.72 | 14.45 | 14.35 |
| ODR 180° C. +/– 3° Arc | | | | | |
| ML | dN · m | 4.1 | 3.9 | 4.2 | 2.6 |
| MH | dN · m | 28.6 | 62.6 | 56.6 | 49.8 |
| ts2 | min | 1.0 | 1.1 | 1.2 | 1.2 |
| t25 | min | 1.3 | 1.7 | 1.7 | 1.7 |
| t50 | min | 1.8 | 2.5 | 2.5 | 2.4 |
| t90 | min | 3.7 | 5.9 | 5.4 | 5.0 |
| Peak Rate | | 17.8 | 28.1 | 24.9 | 20.3 |
| MH – ML | dN · m | 24.5 | 58.7 | 52.4 | 47.2 |
| Press Cure, (1.4 * t90 min)/Median of 3 pulls | | | | | |
| Hardness | Shore A | 72 | 70 | 79 | 76 |
| 100% modulus | MPa | 2.4 | 3.5 | 5.1 | 4.6 |
| 300% modulus | MPa | 5.4 | 8.6 | 9.8 | 0.0 |
| Stress @ break | MPa | 6.4 | 10.1 | 9.8 | 8.5 |
| Strain @ break | % | 397 | 414 | 309 | 299 |
| Tear-Die C (avg. Peak Value) | N/mm | 28.4 | 33.4 | 29.4 | 27.1 |

TABLE 5-continued

Compound Rheology Properties of Example 3

| Property | Units | 3-C1 | 3-C2 | 2-1 | 2-2 |
|---|---|---|---|---|---|
| Compound Green Tear Strength | | | | | |
| Die C: Max Value | N/mm | 3.5 | 3.2 | 12.2 | 8.9 |
| Compression Set (press cure 180° C. @ tc90 * 1.4 * 1.5 min) | | | | | |
| 168 h, 70° C., 25% deflection | % | 55.1 | 30.8 | 35.5 | 39.5 |

Mooney Scorch as set forth in Table 5 is essentially a measurement of the rate at which a rubber compound will cure or set up in a Mooney test. For example, t1 implies how long it takes for the compound to increase in viscosity by 1 Mooney Unit from the minimum value; t5 implies time for 5 MU increase, and so on. The faster a compound cures, the lower its Mooney Scorch times.

Figure 7:
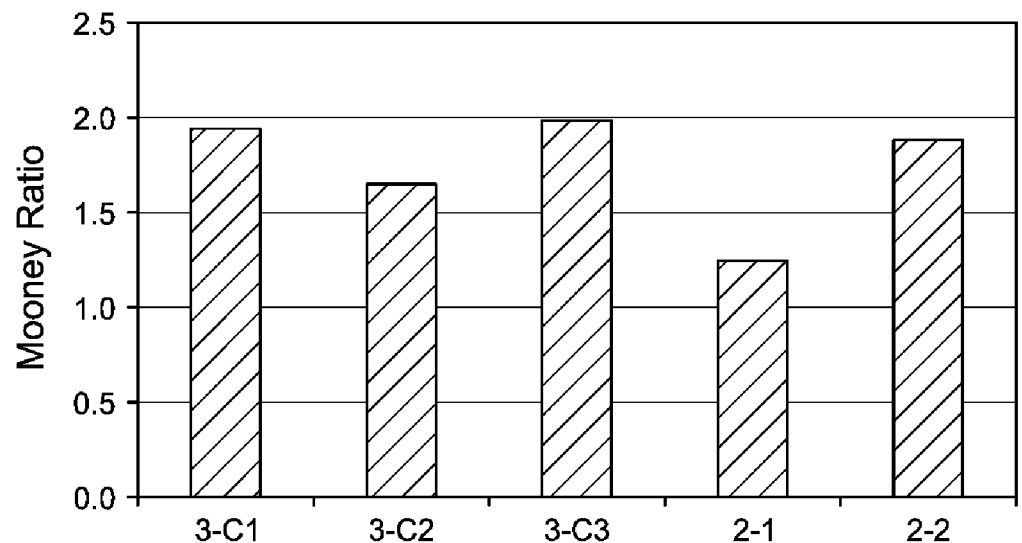
FIG. 7 is a graph of Mooney Ratios for samples in accordance with Example 3.

Mooney Viscosity was determined for both (i) polymer alone; and (ii) each compound made using the polymers in order to determine Mooney Ratio for each polymer. The Mooney Ratio is defined as the ratio of compound Mooney Viscosity (1+4) measured at 100° C. to the polymer Mooney Viscosity (1+4) measured at 125° C. A lower Mooney ratio is indicative of increased branching in the polymer. FIG. 7 shows the Mooney Ratios for inventive Samples 2-1 and 2-2, as well as for the comparative samples. As seen in FIG. 7, the compound containing the inventive polymer Sample 2-1 shows the lowest Mooney Ratio. The compound with Sample 2-2 has a similar Mooney Ratio as the three comparators (lower than 3-C1 and 3-C3, slightly higher than 3-C2).

Figure 8:
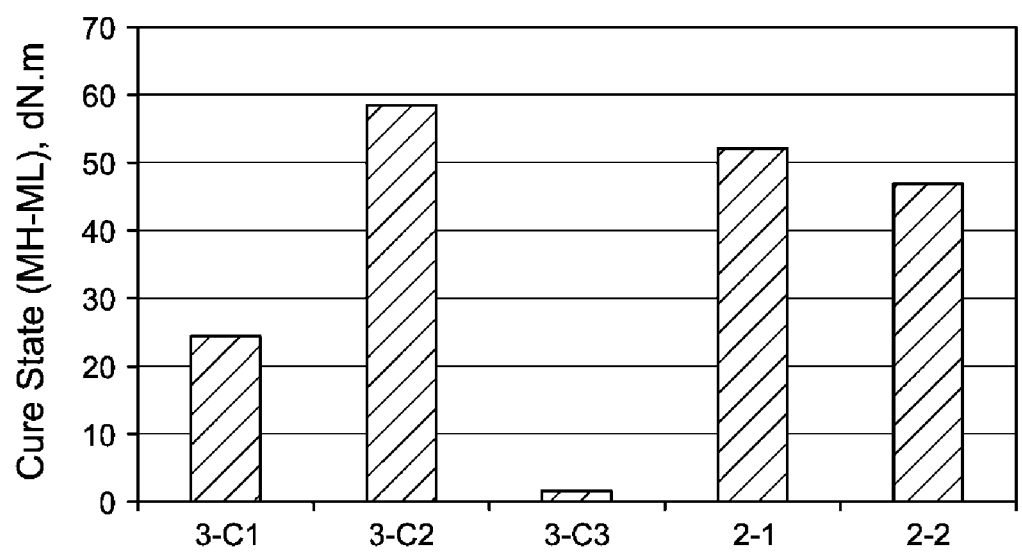
FIG. 8 is a graph of cure state of compounds in accordance with Example 3.

FIG. 8 compares the cure state of the compounds containing the control samples and the inventive polymers. The cure state is defined as the difference between the highest torque value (MH) and the lowest torque value (ML) registered in the Oscillating Disc Rheometer (ODR) when the sample was cured were registered during that cure. The difference MH-ML is indicative of the state of cure. Cure state can be influenced by the diene content and the molecular weight distribution. Sample 3-C3 is an EP copolymer and will not cure with sulfur as the cross linking agent (due to lack of diene monomers), so it is not shown in FIG. 8. FIG. 8 illustrates that rubber compounds made from the inventive polymers exhibit comparable or higher cure state as compared to rubber compounds made from the comparative polymer samples.

Figure 9:
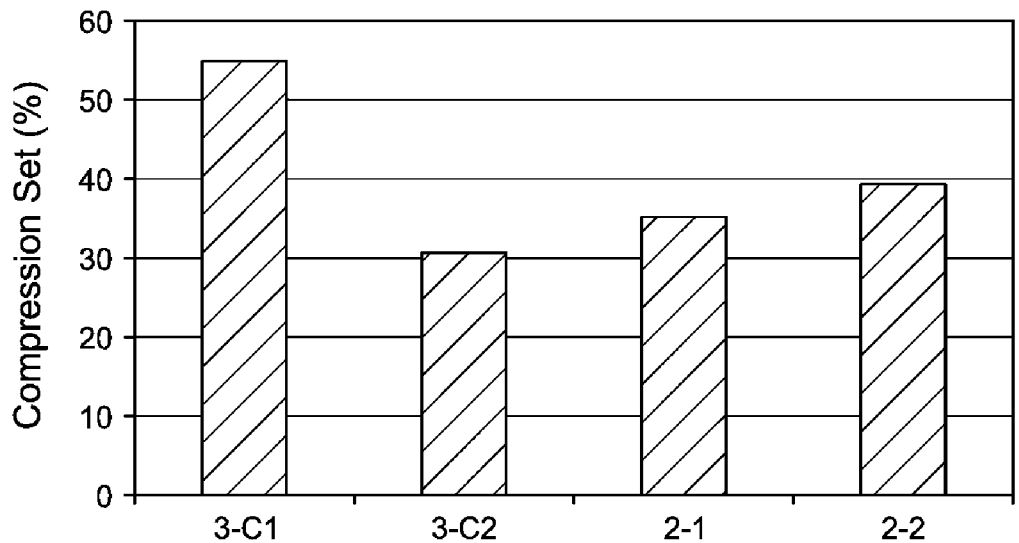
FIG. 9 is a graph showing compression set for compounds in accordance with Example 3.

FIG. 9 shows the compression set for compounds containing the comparator polymers and the samples 2-1 and 2-2, respectively. Samples 2-1 and 2-2 have a higher ethylene content compared to the control polymers, which normally adversely influences compression set. Compounds containing Sample 2-1 and 2-2; however, have surprisingly lower compression set compared to compounds containing the comparable 3-C1 and 3-C2-based formulations.

Small Angle Oscillatory Shear (SAOS) measurements were carried out on the Example 3 compounds using the ATD® 1000 Rubber Process Analyzer from Alpha Technologies. A sample of approximately 4.5 gm weight is mounted between the parallel plates of the ATD® 1000. The test temperature is 100° C., the applied strain is 14% and the frequency was varied from 0.1 rad/s to 200 rad/s. The complex modulus (G*), complex viscosity (η*) and the phase angle (δ) are measured at each frequency.

Figure 10:
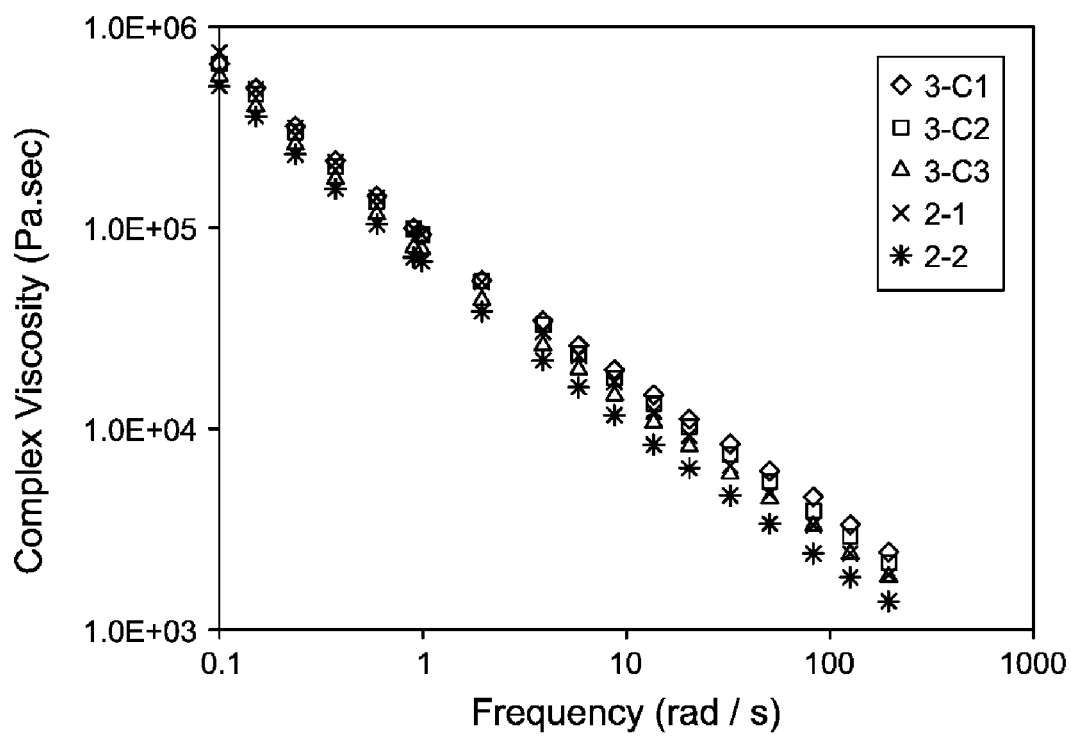
FIG. 10 is a plot of complex viscosity vs. shear frequency for samples in accordance with Example 3.
Figure 11:
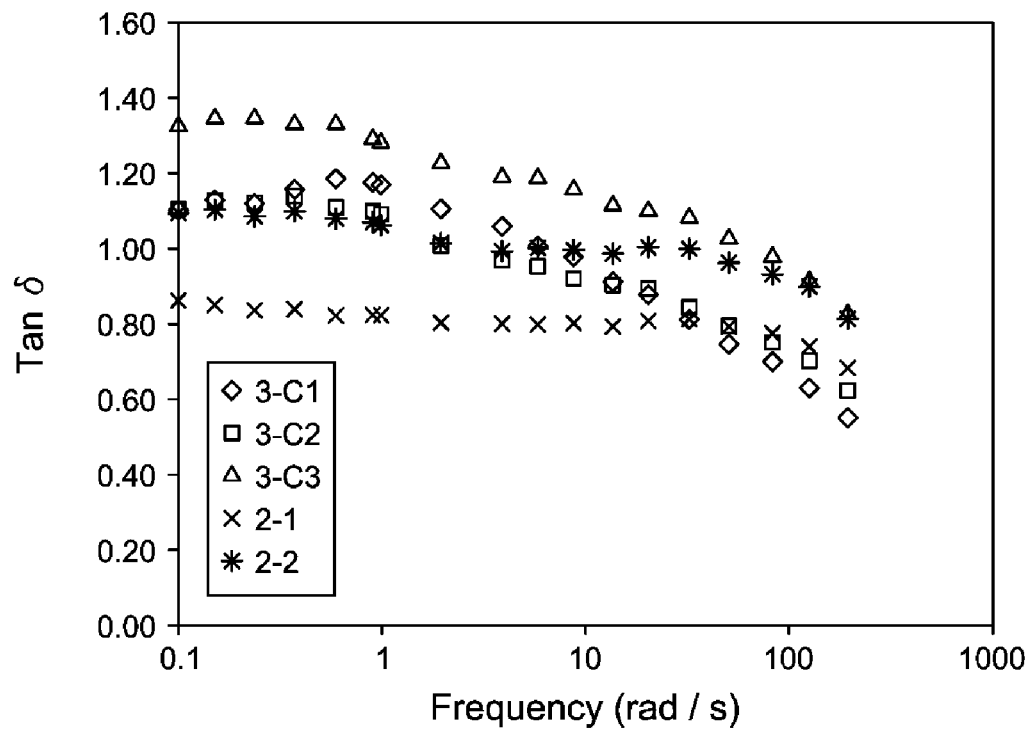
FIG. 11 is a plot of Tan($\delta$) vs. shear frequency for samples in accordance with Example 3.

FIG. 10 shows a plot of complex viscosity versus frequency for the compound containing the inventive polymers 2-1, 2-2 and the corresponding compounds made from 3-C1, 3-C2, and 3-C3 control polymers. The formulation with the inventive polymer shows more shear-thinning, relative to the control samples. FIG. 11 shows a plot of tan (delta) versus frequency for compounds containing inventive polymer 2-1, 2-2 and the controls. The formulation with the inventive polymer shows a high degree of melt elasticity, evidenced by the low tan (delta) values across the frequency range. The combination of lower viscosity at high frequency and higher melt elasticity are attributes that aid processing (e.g., throughput and dimensional stability during extrusion).

Example 4

Figure 12:
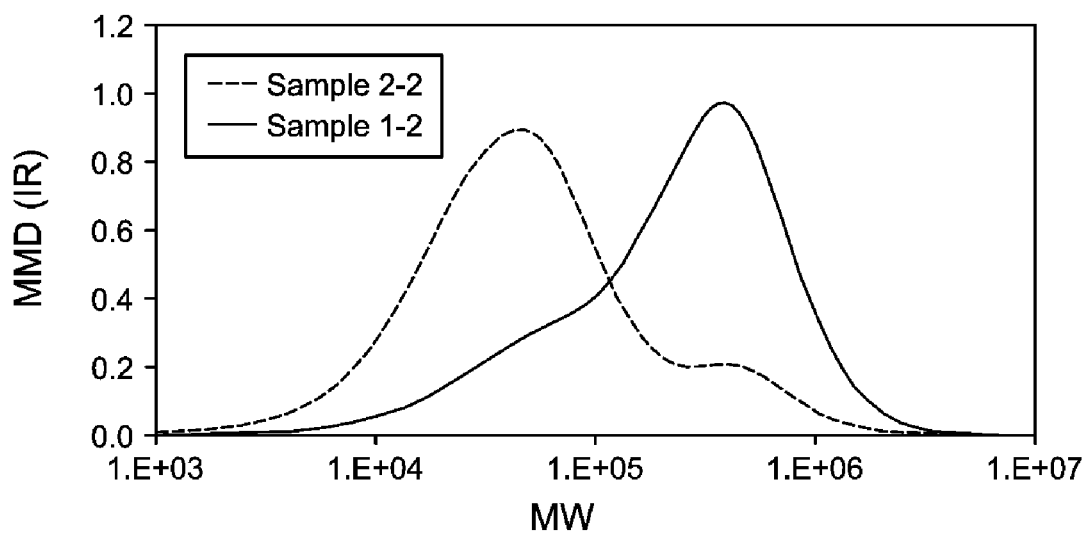
FIG. 12 is a plot of molecular weight distributions for two samples prepared in accordance with Examples 1 and 3.

To those skilled in the art, it is recognized that the ratio of products from the two catalysts are a function of their relative polymerization activities. Also, it is recognized that there exists catalyst poisons such as, but not limited to, oxygen and moisture that may have different poisoning efficiencies for the different catalysts. It is also recognized that temperature or monomer concentration can affect the polymerization rates of catalysts differently. As such, there exists a range of catalyst ratios that may make similar product in different processes depending on the amount of poisons present, temperature or monomer concentration. Nevertheless, as discussed previously herein, low Mooney viscosities will generally be achievable by low ratios (mol:mol) of first metallocene catalyst to second metallocene catalyst of various embodiments described herein, while higher Mooney viscosities will generally be achievable with relatively high catalyst ratios. This is also reflected in molecular weight distributions of these two limits, as illustrated for some of the above Sample compositions in FIG. 12. The plot in FIG. 12 shows two molecular weight distributions determined in accordance with the GPC-IR procedures described above: for Sample 2-2 (15.0 MU (ML, 1+4 @ 100° C.)) and Sample 1-2 (56.7 MU (MST, 5+4 @ 200° C.)). There is clearly a larger amount of low molecular weight (low Mooney) component present in the 15.0 MU Sample 2-2. Table 6 lists the molecular weight characteristics of the two samples; lower Mn is clearly seen for example 2-2 with the lower catalyst ratio.

TABLE 6

Molecular Weight Characteristics of Different Catalyst Ratios

| Sample | Catalyst Ratio (mol A:mol B) | Mn | Mw |
|---|---|---|---|
| 2-2 | 1.46 | 22284 | 109412 |
| 1-2 | 3.4 | 85403 | 374688 |

All documents described herein are incorporated by reference, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" to require the listed components without excluding the presence of any other additional components. Likewise whenever a composition, an element or a group of elements is preceded with the transitional phrase "comprising", it is understood that we also contemplate the same composition or group of elements further narrowed with more restrictive transitional phrases such as "consisting essentially of", "consisting of", "selected from the group of consisting of", or "is" preceding the recitation of the composition, element, or elements and vice versa.

The invention claimed is:

1. A process comprising:

(a) carrying out a polymerization reaction that comprises polymerizing a plurality of monomers comprising (i) a first $C_2$-$C_{20}$ α-olefin monomer; (ii) a second $C_2$-$C_{20}$ α-olefin monomer different from the first; and optionally (iii) one or more dienes in the presence of both a first metallocene catalyst and a second metallocene catalyst in a polymerization reaction zone;

wherein the first metallocene catalyst has structure in accordance with Formula (I):

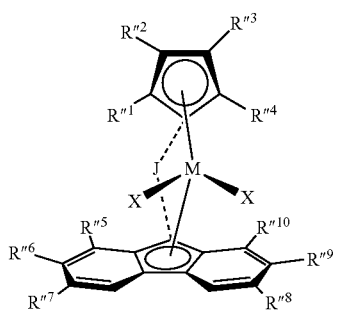

where (1) J is a divalent bridging group comprising C, Si, or both; (2) M is a group 4 transition metal; (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R'''^1$-$R'''^{10}$ is independently hydrogen, $C_1$-$C_{50}$ hydrocarbyl, substituted hydrocarbyl, halocarbyl, or substituted halocarbyl provided that any one or more of the pairs $R'''^1$ and $R'''^2$, $R'''^3$ and $R'''^4$, $R'''^5$ and $R'''^6$, $R'''^6$ and $R'''^7$, $R'''^8$ and $R'''^9$, and $R'''^9$ and $R'''^{10}$, may optionally be bonded together to form a saturated or partially saturated cyclic or fused ring structure;

further wherein the second metallocene catalyst has structure in accordance with Formula (II):

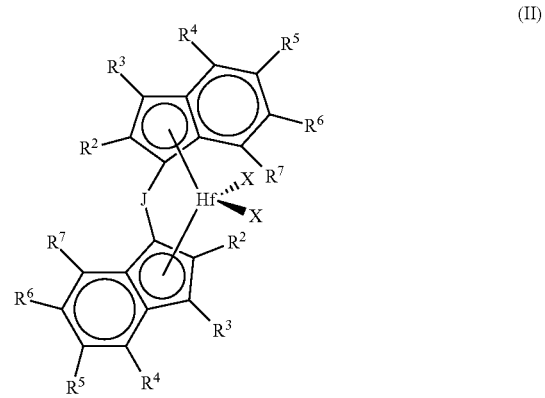

where: (1) J is a divalent bridging group comprising C, Si, or both; (2) each X is independently a univalent anionic ligand, or two Xs are joined and bound to the metal atom to form a metallocycle ring, or two Xs are joined to form a chelating ligand, a diene ligand, or an alkylidene ligand; and (3) each $R^2$-$R^7$ is independently hydrogen, $C_1$-$C_{50}$ substituted or unsubstituted hydrocarbyl, or $C_1$-$C_{50}$ substituted or unsubstituted halocarbyl, provided that any one or more of the pairs $R^4$ and $R^5$, $R^5$ and $R^6$, and $R^6$ and $R^7$ may be bonded together to form a saturated or partially saturated cyclic or fused ring structure;

(b) controlling the polymerization reaction so as to obtain a copolymer composition having Mooney viscosity within the range from 30 to 40 MU (MST, 5+4 @ 200° C.) and comprising units derived from the first $C_2$-$C_{20}$ α-olefin monomer, the second $C_2$-$C_{20}$ α-olefin monomer, and optionally the one or more dienes; and (c) controlling the polymerization such that the copolymer composition has Mooney Relaxation Area (MSTRA) within the range from 350 to 550 MU-sec, wherein the controlling (c) is based at least in part upon the molar ratio of the first metallocene catalyst to the second metallocene catalyst in the polymerization reaction.

2. The process of claim 1, wherein the first $C_2$-$C_{20}$ α-olefin monomer is ethylene, and the second $C_2$-$C_{20}$ α-olefin monomer is one of propylene and 1-butene.

3. The process of claim 1, wherein the plurality of monomers comprises one or more dienes selected from the group consisting of: 5-ethylidene-2-norbornene (ENB), 5-vinyl-2-norbornene (VNB), 1,4-hexadiene, dicyclopentadiene, and any combination thereof.

4. The process of claim 1, wherein the molar ratio of the first metallocene catalyst to the second metallocene catalyst is controlled within the range from 0.8 to 6.

5. The process of claim 4, wherein the molar ratio of the first metallocene catalyst to the second metallocene catalyst is controlled within the range from 1.5 to 2.0.

6. The process of claim 1, wherein the controlling (b) is based at least in part upon one or more of: (i) temperature of the polymerization reaction zone; (ii) monomer concentration in the polymerization reaction zone; and (iii) an amount of chain transfer agent fed to the polymerization reaction zone.

7. The process of claim 6, wherein the temperature of the polymerization reaction zone is maintained within the range from 95° C. to 150° C.

8. The process of claim 6, wherein the polymerization reaction is continuous, and the amount of chain transfer agent fed to the polymerization reaction zone is 500 wppm or less on the basis of mass of monomers, catalyst, and solvent fed to the polymerization reaction zone.

9. The process of claim 1, wherein, in Formula (I): (1) $R'''^6$ and $R'''^9$ are each $C_1$ to $C_4$ alkyl; (2) $R''^1$-$R''^4$, $R''^5$, $R''^7$, $R''^8$, and $R''^{10}$ are each independently methyl, ethyl, or H; (3) J is $(p\text{-}(Et)_3SiPh)_2C$; (4) M is Hf; and (5) each X is $C_1$-$C_3$ alkyl or halide.

10. The process of claim 9, wherein the first metallocene catalyst comprises 1,1'-bis(4-triethylsilylphenyl)methylene-(cyclopentadienyl)(2,7-di-tertiary-butyl-fluoren-9-yl)hafnium dimethyl.

11. The process of claim 1, wherein, in Formula (II): (1) each $R^4$ and $R^7$ is independently $C_1$-$C_5$ alkyl; (2) each $R^2$ is H or $C_1$-$C_5$ alkyl; (3) $R^3$, $R^5$, and $R^6$ are each independently H or $C_1$-$C_5$ alkyl; (4) J is cyclopentamethylenesilylene, cyclotetramethylenesilylene, cyclotrimethylenesilylene, cyclopropandiyl, cyclobutandiyl, cyclopentandiyl, or cyclohexandiyl; and (5) each X is independently a halide or $C_1$-$C_3$ alkyl.

12. The process of claim 11, wherein the second metallocene catalyst comprises cyclotetramethylenesilylene-bis (4,7-dimethylinden-1-yl)hafnium dimethyl.

13. The process of claim 1, wherein the first monomer is ethylene, and wherein the copolymer composition comprises from 45 wt % to 60 wt % ethylene-derived units (corrected for diene content, if any).

14. The process of claim 1, wherein the copolymer composition exhibits one or more of the following properties:
   (i) phase angle (δ) at complex modulus $G^*=1.1\times10^5$ within the range from 15° to 40°;
   (ii) tan(δ) at 0.245 Rad/s within the range from 0.350 to 0.800; and
   (iii) shear thinning ratio (STR) within the range from 200 to 500.

15. A process comprising:
   (a) polymerizing a plurality of monomers comprising (i) a first $C_2$-$C_{20}$ α-olefin monomer; (ii) a second $C_2$-$C_{20}$ α-olefin monomer different from the first; and optionally (iii) one or more dienes in the presence of both a first metallocene catalyst and a second metallocene catalyst in a polymerization reaction zone;
   wherein the first metallocene catalyst has structure in accordance with Formula

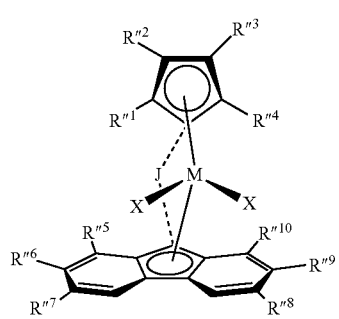

(I)

where (1) J is a divalent bridging group comprising C, Si, or both; (2) M is a group 4 transition metal; (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R'''^1$-$R'''^{10}$ is independently hydrogen, $C_1$-$C_{50}$ hydrocarbyl, substituted hydrocarbyl, halocarbyl, or substituted halocarbyl provided that any one or more of the pairs $R'''^1$ and $R'''^2$, $R'''^3$ and $R'''^4$, $R'''^5$ and $R'''^6$, $R'''^6$ and $R'''^7$, $R'''^8$ and $R'''^9$, and $R'''^9$ and $R'''^{10}$, may optionally be bonded together to form a saturated or partially saturated cyclic or fused ring structure;

further wherein the second metallocene catalyst has structure in accordance with Formula (II):

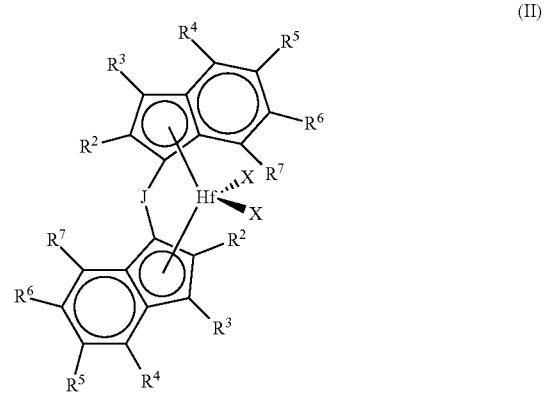

(II)

where: (1) J is a divalent bridging group comprising C, Si, or both; (2) each X is independently a univalent anionic ligand, or two Xs are joined and bound to the metal atom to form a metallocycle ring, or two Xs are joined to form a chelating ligand, a diene ligand, or an alkylidene ligand; and (3) each $R^2$-$R^7$ is independently hydrogen, $C_1$-$C_{50}$ substituted or unsubstituted hydrocarbyl, or $C_1$-$C_{50}$ substituted or unsubstituted halocarbyl, provided that any one or more of the pairs $R^4$ and $R^5$, $R^5$ and $R^6$, and $R^6$ and $R^7$ may be bonded together to form a saturated or partially saturated cyclic or fused ring structure; and (b) obtaining a copolymer composition having Mooney viscosity within the range from 30 to 40 MU (MST, 5+4 @ 200° C.), Mooney Relaxation Area (MSTRA) within the range from 350 to 550 MU-sec, and comprising units derived from the first $C_2$-$C_{20}$ α-olefin monomer, the second $C_2$-$C_{20}$ α-olefin monomer, and optionally the one or more dienes.

16. A copolymer composition formed by the process of claim 1.

* * * * *